United States Patent
Hatae et al.

(10) Patent No.: US 9,496,966 B2
(45) Date of Patent: Nov. 15, 2016

(54) OPTICAL COMMUNICATION RECEIVING DEVICE AND FREQUENCY OFFSET COMPENSATION METHOD

(71) Applicant: FUJITSU LIMITED, Kawasaki-shi (JP)

(72) Inventors: Kazuhiko Hatae, Kawasaki (JP); Nobukazu Koizumi, Kawasaki (JP); Koji Nakamuta, Yokohama (JP); Manabu Yamazaki, Fuchu (JP); Tomoki Katou, Kawasaki (JP); Masashi Sato, Kawasaki (JP); Hisao Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 37 days.

(21) Appl. No.: 14/495,499

(22) Filed: Sep. 24, 2014

(65) Prior Publication Data

US 2015/0098714 A1    Apr. 9, 2015

(30) Foreign Application Priority Data

Oct. 9, 2013 (JP) ................................. 2013-211819

(51) Int. Cl.
 *H04B 10/00* (2013.01)
 *H04B 10/61* (2013.01)
(52) U.S. Cl.
 CPC ................................ *H04B 10/6164* (2013.01)
(58) Field of Classification Search
 CPC ................... H04B 10/6165; H04L 2027/0026; H04L 2027/0067
 USPC ....................................................... 398/208
 See application file for complete search history.

(56) References Cited

U.S. PATENT DOCUMENTS

| | | | | |
|---|---|---|---|---|
| 5,049,830 A | * | 9/1991 | Yoshida | .............. H04L 27/2276 329/306 |
| 7,606,498 B1 | * | 10/2009 | Wu | ......................... H04B 10/60 398/152 |
| 8,170,170 B2 | | 5/2012 | Matsumoto et al. | |
| 8,295,713 B2 | | 10/2012 | Cai | |

(Continued)

FOREIGN PATENT DOCUMENTS

| | | |
|---|---|---|
| JP | 2008-271182 | 11/2008 |
| JP | 2012-520614 | 9/2012 |
| WO | WO 2010/104785 | 9/2010 |

*Primary Examiner* — David Payne
*Assistant Examiner* — Tanya Motsinger
(74) *Attorney, Agent, or Firm* — Staas & Halsey LLP

(57) ABSTRACT

A receiving device that converts, to a digital signal, a signal in which signal light from an optical transmission path and local oscillation light are mixed, so as to perform digital signal processing, the optical communication receiving device comprising: a frequency offset compensation unit configured to calculate a frequency offset of the digital signal and to, based on the frequency offset, compensate for a phase of the digital signal; a carrier phase recovery unit configured to calculate a carrier phase of the digital signal whose phase is compensated for in the frequency offset compensation unit; and a residual frequency offset detection unit configured to calculate an average of differences in the carrier phase, and to output the average as a residual frequency offset, wherein the frequency offset compensation unit is configured to correct the frequency offset using the residual frequency offset output by the residual frequency offset detection unit.

5 Claims, 17 Drawing Sheets

(56) References Cited

U.S. PATENT DOCUMENTS

| | | | | |
|---|---|---|---|---|
| 8,301,037 | B2* | 10/2012 | Pfau | H04J 14/06 |
| | | | | 398/152 |
| 8,472,814 | B2* | 6/2013 | Zhang | H04B 10/6161 |
| | | | | 398/158 |
| 2009/0129787 | A1* | 5/2009 | Li | H04B 10/61 |
| | | | | 398/208 |
| 2009/0142076 | A1* | 6/2009 | Li | H04B 10/61 |
| | | | | 398/208 |
| 2009/0317092 | A1* | 12/2009 | Nakashima | H04B 10/61 |
| | | | | 398/204 |
| 2010/0002810 | A1* | 1/2010 | Li | H04B 10/60 |
| | | | | 375/325 |
| 2010/0232805 | A1* | 9/2010 | Cai | H04B 10/61 |
| | | | | 398/158 |
| 2011/0129041 | A1* | 6/2011 | Ishihara | H04B 7/084 |
| | | | | 375/340 |
| 2012/0155890 | A1* | 6/2012 | Zhou | H04B 10/6165 |
| | | | | 398/208 |
| 2012/0308233 | A1* | 12/2012 | Hironishi | H04B 10/611 |
| | | | | 398/65 |
| 2013/0202069 | A1* | 8/2013 | Nilsson | H04L 27/2657 |
| | | | | 375/343 |
| 2015/0055788 | A1* | 2/2015 | Zakis | H04R 3/002 |
| | | | | 381/71.1 |
| 2015/0236795 | A1* | 8/2015 | Malouin | H04B 10/6161 |
| | | | | 398/65 |

* cited by examiner

OPTICAL COMMUNICATION RECEIVING DEVICE AND FREQUENCY OFFSET COMPENSATION METHOD

CROSS-REFERENCE TO RELATED APPLICATION

This application is based upon and claims the benefit of priority of the prior Japanese Patent Application No. 2013-211819, filed on Oct. 9, 2013, the entire contents of which are incorporated herein by reference.

FIELD

The embodiment discussed herein is related to an optical communication receiving device and a frequency offset compensation method.

BACKGROUND

Together with an increase in the volume of transmission traffic in recent years, there are growing demands for next-generation optical transmission systems with a transmission rate over 100 Giga bit per second (Gbps). In these next-generation optical transmission systems, it is also desired to achieve a transmission distance longer than in conventional systems.

However, in terms of achieving a transmission rate over 100 Gbps, conventional optical dispersion compensation technologies have reached their limit for compensation performance. For this reason, a digital coherent optical receiver using a digital coherent receiver system, which is capable of compensating for waveform distortion in a wide range with high accuracy, is desired. The digital coherent receiver system is a system in which information on both optical amplitude and phase is converted to electric signals for reception.

Japanese Laid-open Patent Publication No. 2008-271182 and Japanese National Publication of International Patent Application No. 2012-520614 disclose examples of the related art.

By using a local oscillator having the same frequency as a received signal (laser light), a digital coherent optical receiver mixes the received signal and local oscillation light using an optical phase hybrid, and extracts electric fields (amplitudes) and phase components of the received signal. The digital coherent optical receiver additionally performs photoelectric conversion, analog-to-digital (A/D) conversion, and digital signal processing to recover transmission data from the received signal.

However, the frequency of a received signal does not completely match the frequency of a local oscillator, for example, because of individual differences among local oscillators. In order to compensate for the mismatch between the frequencies, the digital coherent optical receiver includes a frequency offset compensation unit that detects and corrects a frequency offset, which is a frequency difference. Unfortunately, noise that increases with the transmission distance makes it difficult for the frequency offset compensation unit to accurately detect a frequency offset. As a result, a phase shift or the like occurs, making it difficult to correctly recover transmission data.

A digital signal processing unit included in the digital coherent optical receiver equalizes waveform distortion by using a distortion equalization unit, and compensates for a shift (offset) in frequency between the light source of the transmitter and the light source of the receiver by using the frequency offset compensation unit. The digital signal processing unit further detects and corrects a phase error (carrier phase) of a code signal point by using the carrier phase recovery unit. Then, the digital signal processing unit performs identification determination and error correction by using an identification determination unit to recover transmission data.

The phase error of the code signal point in the carrier phase recovery unit does not vary in time when compensation for a frequency offset is ideally performed. However, it is known that, if noise increases, the carrier phase recovery unit makes a false detection of a phase error, because of a residual frequency offset, so that a phase slip occurs, and the carrier phase recovery unit fails to correct an error, thereby giving rise to a transmission error. The residual frequency offset is a residue that remains after the frequency offset has been compensated for by the frequency offset compensation unit.

Conventionally, in order to decrease the amount of noise so as to avoid a situation in which there is a residual frequency offset, it has been desired, for example, to decrease the transmission distance. This inhibits freedom of system design. To address this, a digital signal processing unit of a digital coherent optical receiver that is capable of reducing a residual frequency offset and compensating for waveform distortion with high accuracy is desired.

SUMMARY

According to an aspect of the embodiments, an optical communication receiving device that converts, to a digital signal, a signal in which signal light from an optical transmission path and local oscillation light are mixed, so as to perform digital signal processing, the optical communication receiving device comprising: a frequency offset compensation unit configured to calculate a frequency offset of the digital signal and to, based on the frequency offset, compensate for a phase of the digital signal; a carrier phase recovery unit configured to calculate a carrier phase of the digital signal whose phase is compensated for in the frequency offset compensation unit; and a residual frequency offset detection unit configured to calculate an average of differences in the carrier phase, and to output the average as a residual frequency offset, wherein the frequency offset compensation unit is configured to correct the frequency offset using the residual frequency offset output by the residual frequency offset detection unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Hereinafter, an embodiment will be described with reference to the accompanying drawings. The configurations of the embodiment are merely exemplary, and the configurations of this disclosure are not limited to specific configurations of the disclosed embodiment. To implement the configurations of this disclosure, specific configurations according to the embodiment may be appropriately adopted.

[Embodiment]

(Configuration Example)

Figure 1:
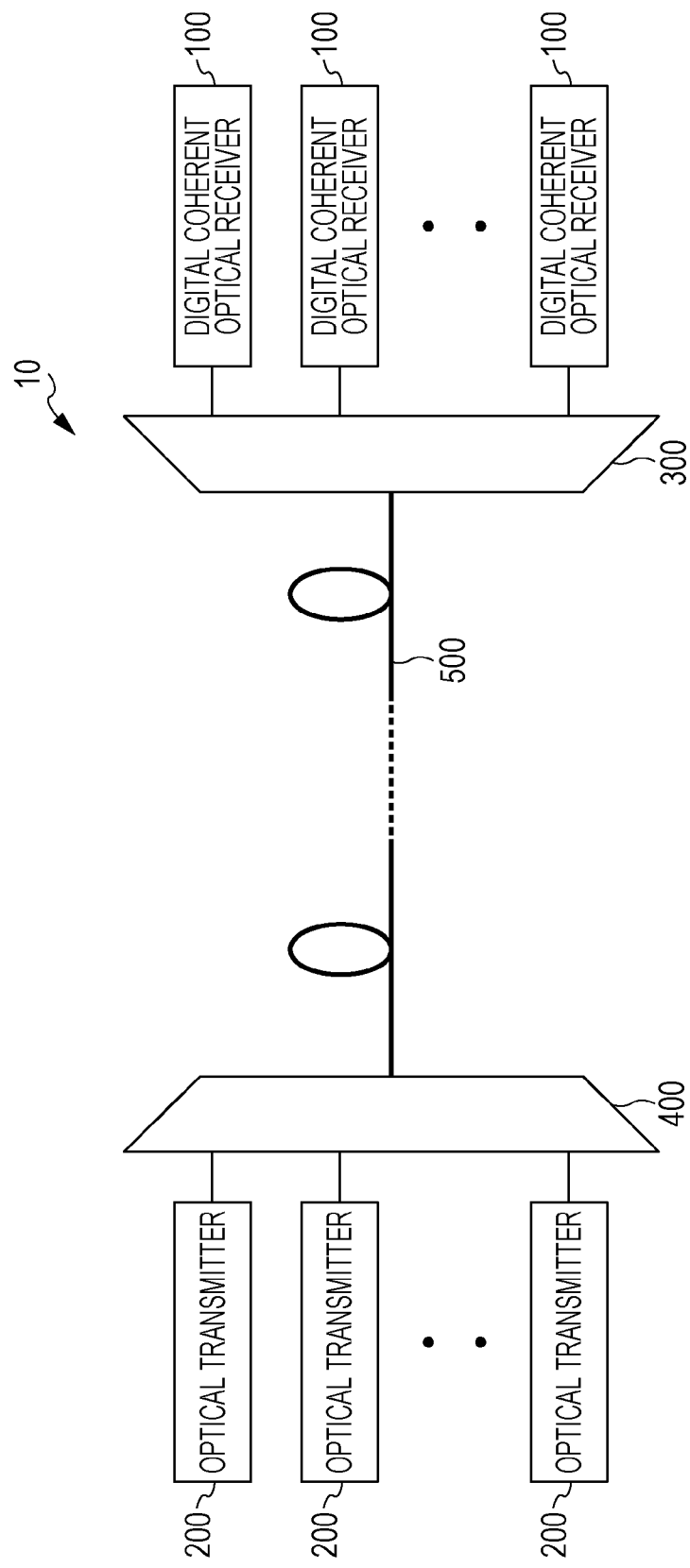
FIG. 1 is a block diagram illustrating an example of a configuration of an optical communication system of an embodiment.

FIG. 1 is a block diagram illustrating an example of a configuration of an optical communication system of this embodiment. An optical communication system 10 of FIG. 1 includes a plurality of optical transmitters 200, a wavelength division multiplexer 400, an optical transmission path 500, a wavelength separator 300, and a plurality of digital coherent optical receivers 100. In the optical communication system 10, optical signals are transmitted from transmitter-side devices (the optical transmitters 200 and the wavelength division multiplexer 400) through the optical transmission path 500 to receiver-side devices (the wavelength separator 300 and the digital coherent optical receivers 100). The digital coherent optical receiver 100 is an example of the optical communication receiving device.

The optical transmitter 200 converts an electric signal based on transmission data to an optical signal, and outputs the optical signal to the wavelength division multiplexer 400. Modulation schemes for optical signals are binary phase shift keying (BPSK), quadrature phase shift keying (QPSK), and 16 quadrature amplitude modulation (QAM), and so forth. Here, the modulation scheme for optical signals is QPSK unless otherwise noted herein.

The wavelength division multiplexer 400 multiplexes respective optical signals output from the optical transmitters 200, and outputs the multiplexed optical signals to the optical transmission path 500.

The optical transmission path 500 transmits the multiplexed optical signals to receiving-side devices. A relay device may be included in the optical transmission path 500. The relay device amplifies optical signals or branches optical signals, for example. The relay device may have, for example, a function of compensating for dispersion of optical signals.

The wavelength separator 300 separates the optical signals transmitted through the optical transmission path 500 by wavelength, and outputs the optical signals to the digital coherent optical receiver 100.

The digital coherent optical receiver 100 receives an optical signal having a predetermined wavelength. The digital coherent optical receiver 100 generates a digital signal based on the received optical signal. The digital coherent optical receiver 100 obtains the original data (transmission data) from the generated digital signal.

Figure 2:
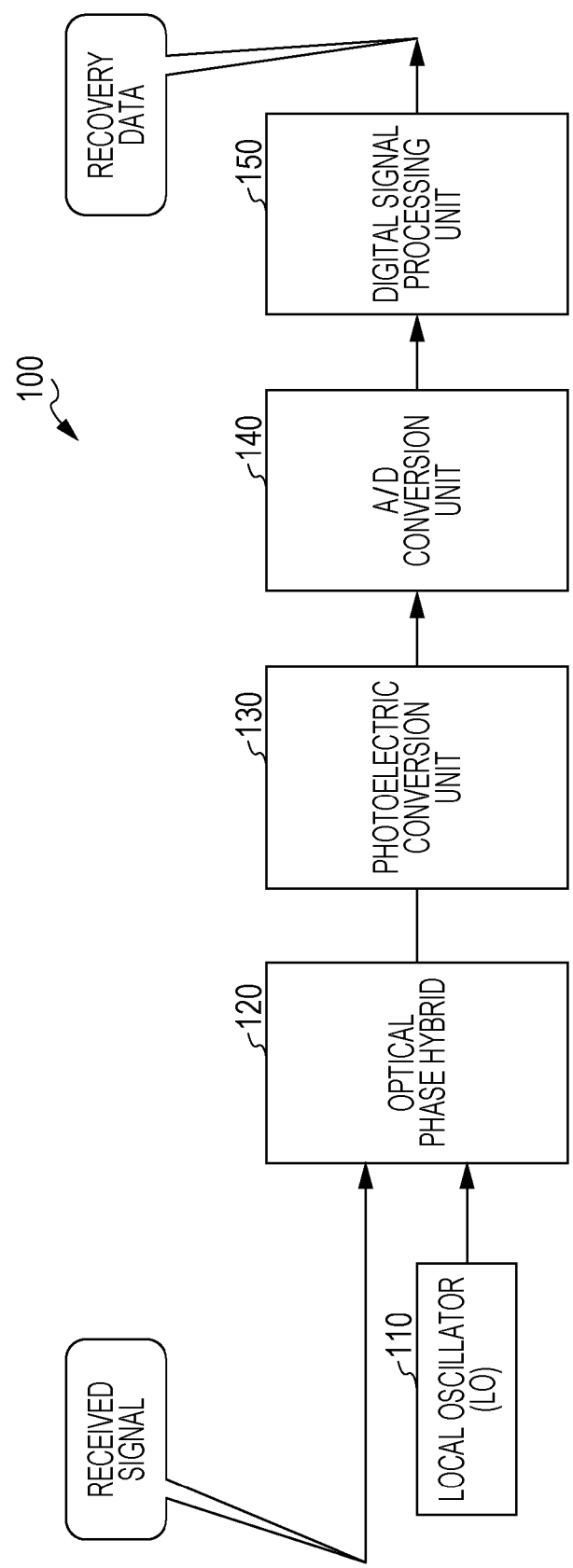
FIG. 2 is a block diagram illustrating an example of a configuration of a digital coherent optical receiver.

FIG. 2 is a block diagram illustrating an example of a configuration of a digital coherent optical receiver. The digital coherent optical receiver 100 of FIG. 2 includes a local oscillator 110, an optical phase hybrid 120, a photoelectric conversion unit 130, an analog-to-digital (A/D) conversion unit 140, and a digital signal processing unit 150.

The local oscillator 110 is a light source that oscillates laser light having the same frequency as a received optical signal. However, there is typically a frequency difference between the frequency of a received signal and the frequency of laser light oscillated by the local oscillator 110, for example, because of the individual difference of the local oscillator 110.

Using the received signal and the laser light oscillated by the local oscillator 110, the optical phase hybrid 120 mixes the received signal and the laser light to generate a pair of optical signals. One optical signal of the pair of optical signals is obtained by combining the received signal and laser light. This optical signal is referred to as an "in-phase (I)-component optical signal". The other optical signal of the pair of optical signals is obtained by combining the received signal and laser light that is obtained by rotating the phase of laser light of the local oscillator 110 by 90 degrees. This optical signal is referred to as a "quadrature-phase (Q)-component optical signal".

The photoelectric conversion unit 130 converts a pair of optical signals to a pair of electric signals (analog signals). That is, the photoelectric conversion unit 130 converts an I-component optical signal and a Q-component optical signal to an I-component electric signal and a Q-component electric signal, respectively.

The A/D conversion unit 140 converts a pair of analog signals to a pair of digital signals. That is, the A/D conversion unit 140 converts an I-component analog signal and a Q-component analog signal to an I-component digital signal and a Q-component digital signal, respectively. The A/D conversion unit 140 converts an analog signal to a digital signal by sampling the analog signal at a predetermined sampling frequency. The I-component digital signal and the Q-component digital signal (complex signal) may be represented by an amplitude-component digital signal and a phase-component digital signal.

The digital signal processing unit 150 performs digital signal processing on a digital signal obtained by conversion in the A/D conversion unit 140 to recover transmission data.

Figure 3:
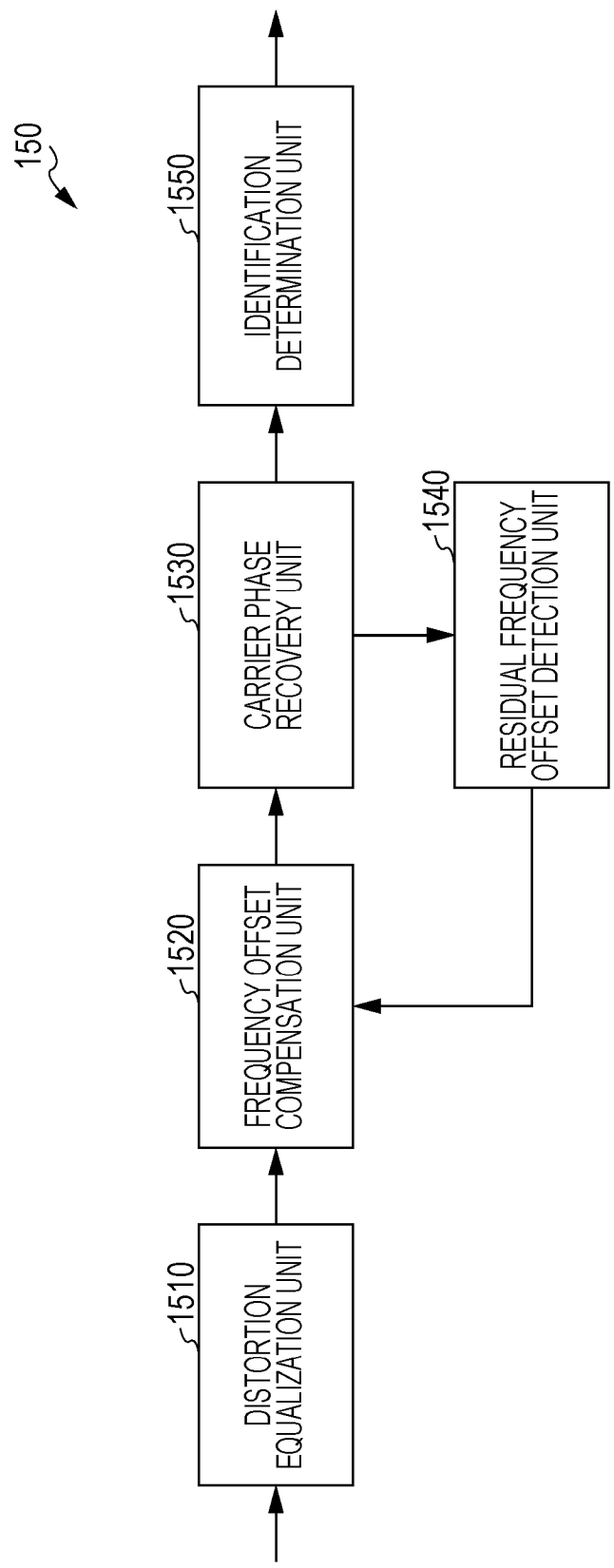
FIG. 3 is a block diagram illustrating an example of a configuration of a digital signal processing unit.

FIG. 3 is a block diagram illustrating an example of a configuration of a digital signal processing unit. The digital signal processing unit 150 of FIG. 3 includes a distortion equalization unit 1510, a frequency offset compensation unit 1520, a carrier phase recovery unit 1530, a residual frequency offset detection unit 1540, and an identification determination unit 1550.

The distortion equalization unit 1510 performs an operation for equalizing waveform distortion of an optical signal on a digital signal input from the A/D conversion unit 140. The distortion equalization unit 1510 equalizes, for example, waveform distortion resulting from the wavelength dispersion of the optical transmission path 500. The units of the digital signal processing unit 150 may each be implemented by one digital signal processor (DSP), or may be implemented by respective different DSPs. The units of the digital signal processing unit 150 may also each be implemented by an application specific integrated circuit (ASIC) or a field-programmable gate array (FPGA).

The frequency offset compensation unit 1520 compensates for a shift (offset) in frequency between the light source of the transmitter and the light source of the receiver. The shift in the frequency of a light source appears as a phase difference (phase error). The frequency offset compensation unit 1520 compensates for a phase error due to a frequency offset by performing integration of a frequency offset amount calculated by a frequency offset estimator (FOE) and taking the product of a complex number for a digital signal (complex signal). Additionally, the frequency offset compensation unit 1520 corrects the frequency offset amount based on a residual frequency offset detected by the residual frequency offset detection unit 1540.

The carrier phase recovery unit 1530 detects a phase error of a code signal point and corrects the phase error. The carrier phase recovery unit 1530 raises the complex electric field (complex signal) of an mPSK signal (digital signal) to the power m to converge the code information into one point on the complex plane. For example, the carrier phase recovery unit 1530 raises the complex electric field of a QPSK signal to the fourth power to converge the code information into one point on the complex plane. Additionally, the carrier phase recovery unit 1530 performs equalization among a certain number of codes to remove a noise component, so that a phase error θe is calculated. The carrier phase recovery unit 1530 makes a determination using ±π/4 thresholds of a phase difference between the previous θe and a newly calculated θe, and calculates a carrier phase θe' in which ±π/2 phase rotation is compensated for (unwrapped). The carrier phase recovery unit 1530 takes the product of a complex number using the calculated θe', so that a phase error is compensated for. The digital signal in which the carrier phase has been compensated for is input to the identification determination unit 1550.

The carrier phase recovery unit 1530 outputs the amount of phase shift (carrier phase) used for recovery, for every symbol, to the residual frequency offset detection unit 1540.

The residual frequency offset detection unit 1540 records the amounts of phase shift in succession, corrects a phase skip component through unwrapping, removes (for example, equalizing) a noise portion, which is a variable fluctuation, and determines a residual frequency offset and feeds it back to the frequency offset compensation unit 1520. The residual frequency offset detection unit 1540 may be included in the frequency offset compensation unit 1520.

The identification determination unit 1550 performs determination and error correction on an output of the carrier phase recovery unit 1530 to recover transmission data.

Figure 4:
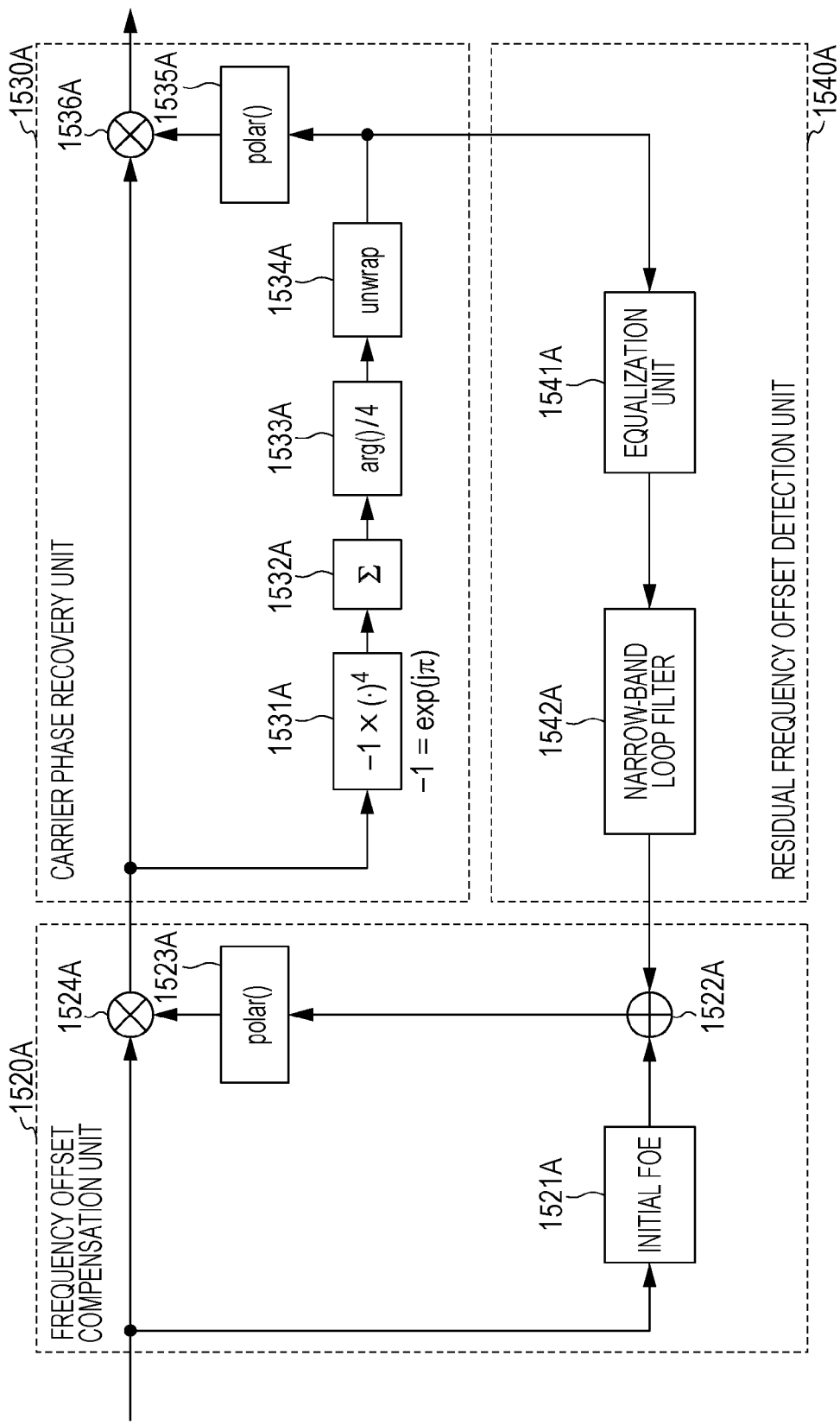
FIG. 4 is a block diagram illustrating a specific configuration example (1) of a frequency offset compensation unit, a carrier phase recovery unit, and a residual frequency offset detection unit in the digital signal processing unit.

FIG. 4 is a block diagram illustrating a specific configuration example (1) of a frequency offset compensation unit, a carrier phase recovery unit, and a residual frequency offset detection unit in the digital signal processing unit. In the configuration example (1) of FIG. 4, a frequency offset compensation unit 1520A includes an initial FOE 1521A, an adder 1522A, an operation unit 1523A, and a multiplication unit 1524A. A carrier phase recovery unit 1530A includes an operation unit 1531A, an operation unit 1532A, an operation unit 1533A, an unwrap unit 1534A, an operation unit 1535A, and a multiplication unit 1536A. A residual frequency offset detection unit 1540A includes an equalization unit 1541A and a narrow-band loop filter 1542A. The frequency offset compensation unit 1520A, the carrier phase recovery unit 1530A, and the residual frequency offset detection unit 1540A are examples of the frequency offset compensation unit 1520, the carrier phase recovery unit 1530, and the residual frequency offset detection unit 1540, respectively.

The frequency offset compensation unit 1520A calculates a frequency offset compensation value based on a frequency offset calculated by the initial FOE 1521A and a residual frequency offset calculated by the residual frequency offset detection unit 1540A. The frequency offset compensation unit 1520A restrains rotation of a digital signal on the complex plane by multiplying the digital signal by a frequency offset compensation value.

The initial FOE 1521A buffers a received signal (digital signal) and calculates a shift in frequency (frequency offset) between the received signal and the local oscillator. A digital signal is input for every symbol. The initial FOE 1521A is, for example, a feed-forward FOE, such as PADE vector. The frequency offset calculated by the initial FOE 1521A is fixed after a predetermined time period has elapsed since the calculation started.

The adder 1522A adds a residual frequency offset calculated by the residual frequency offset detection unit 1540A to the frequency offset calculated by the initial FOE 1521A to produce a new frequency offset.

Based on the frequency offset calculated in the adder 1522A, the operation unit 1523A calculates a compensation value by which a digital signal input from the distortion equalization unit 1510 is to be multiplied.

The multiplication unit 1524A multiplies a digital signal input from the distortion equalization unit 1510 by the compensation value calculated in the operation unit 1523A.

The carrier phase recovery unit 1530A calculates a carrier phase from an input digital signal, and rotates the phase of the input digital signal so that the digital signal is located at a predetermined signal point (modulation point) on the complex plane. The carrier phase recovery unit 1530A also outputs the carrier phase to the residual frequency offset detection unit 1540A.

The operation unit 1531A raises an input complex signal (digital signal) to the fourth power and further multiplies the result by −1. The multiplication by a factor of −1 corresponds to rotation of an angle of π on the complex plane. The QPSK signal is raised to the fourth power and then is multiplied by −1, so that modulation information (the amount of phase rotation due to the modulation component of a signal) is removed.

The phase of the QPSK signal input to the operation unit 1531A is expressed using a phase error θe as follows.

$$\frac{(2n+1)\pi}{4} + \theta_e \quad n = 0, 1, 2, 3$$

The phase of a signal output from the operation unit 1531A for this is expressed as follows.

$$2n\pi + 4\theta_e, n = 0, 1, 2, 3$$

The operation unit 1532A integrates a predetermined number (here assumed to be N) of signals output from the operation unit 1531A. The integrated value, which is an operation result of the operation unit 1532A, is calculated for each of the immediately preceding N symbols. Thus, noise of the signals output from the operation unit 1531A is removed.

The operation unit 1533A calculates the deviation angle of an output of the operation unit 1532A, and quarters the calculated deviation angle. The average of phase errors θe is thereby calculated. The average of phase errors θe is calculated for every symbol.

The operations in the operation unit 1531A, the operation unit 1532A, and the operation unit 1533A are expressed as follows.

$$\overline{\theta_e} = \frac{1}{2}\arg\left[\sum_{i=1}^{N} [I'(i) + jQ'(i)]^4\right]$$

Where I' and Q' are the I component and the Q component of a digital signal input to the carrier phase recovery unit 1530A, respectively.

The unwrap unit 1534A determines whether the phase error exceeds an output range, and, if the phase error exceeds the output range, extends the range of an output signal to thereby maintain the continuity of the output signal. The unwrap unit 1534A determines whether the difference (here assumed to be a−b) between a phase error (here assumed to be a) output by the operation unit 1533A and a phase error (here assumed to be b) output immediately before a by the operation unit 1533A is in the range from −π/4 to +π/4. If the difference is not in the range from −π/4 to +π/4, the unwrap unit 1534A corrects the value of the phase error. An output from the unwrap unit 1534A is input to the operation unit 1535A and the equalization unit 1541A of the residual frequency offset detection unit 1540A.

Figure 5:
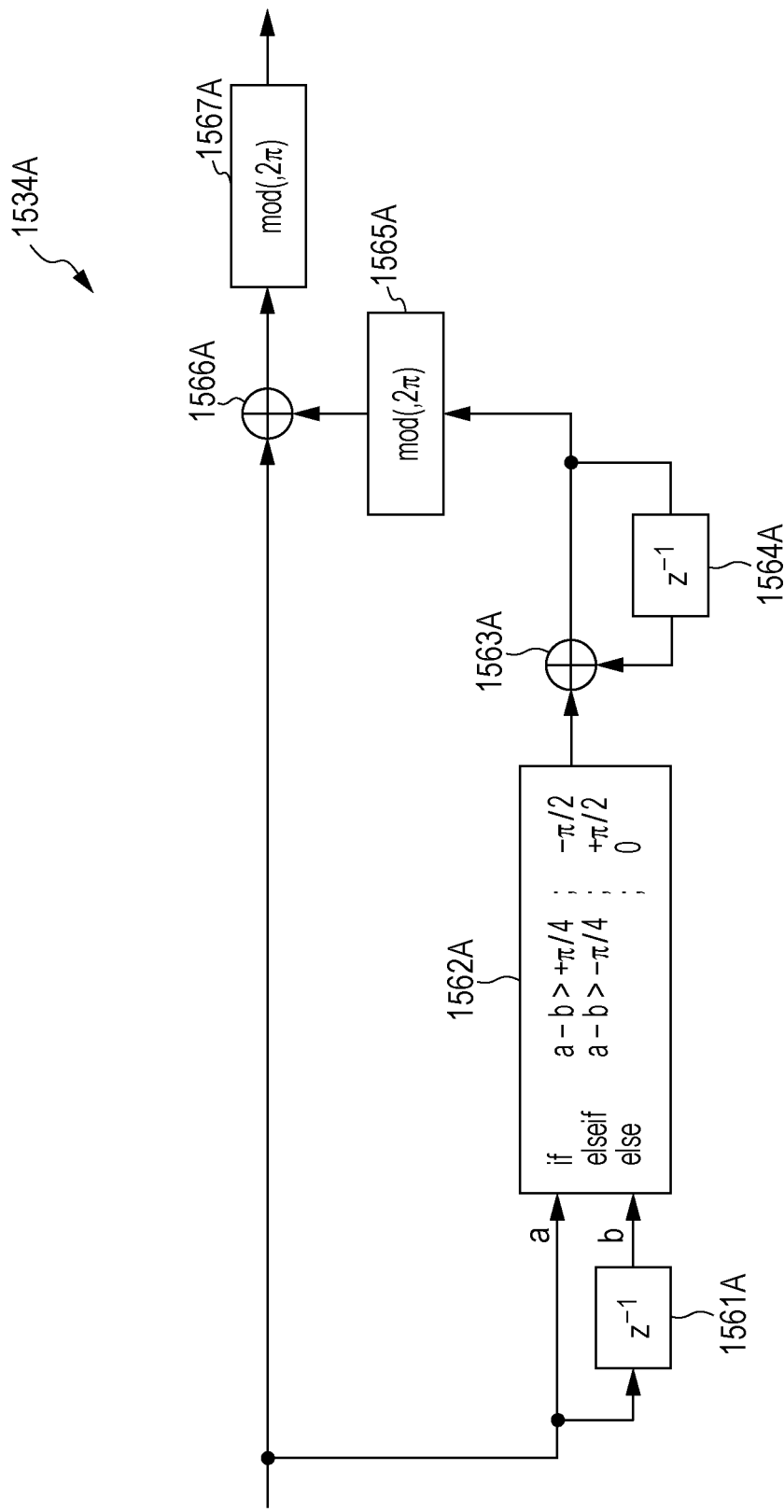
FIG. 5 is a block diagram illustrating an example of a configuration of an unwrap unit.

FIG. 5 is a block diagram illustrating an example of a configuration of an unwrap unit. The unwrap unit 1534A of FIG. 5 includes a delay unit 1561A, an operation unit 1562A, an addition unit 1563A, a delay unit 1564A, an operation unit 1565A, an addition unit 1566A, and an operation unit 1567A.

The average of phase errors input to the unwrap unit 1534A is input to the delay unit 1561A and the operation unit 1562A. The delay unit 1561A performs a delay operation on the input average of phase errors, and outputs the result to the operation unit 1562A.

The operation unit 1562A takes a difference between the average (assumed to be a) of the current phase errors input from the operation unit 1533A and the average (assumed to be b) of the past phase errors input from the delay unit 1561A. If (a−b) is greater than +π/4, the operation unit 1562A outputs −π/2. If (a−b) is less than −π/4, the operation unit 1562A outputs +π/2. If (a−b) is equal to or less than +π/4 and is equal to or greater than −π/4, the operation unit 1562A outputs zero.

The addition unit 1563A adds an output of the operation unit 1562A and an output of the delay unit 1564A. The delay unit 1564A performs a delay operation on an output of the addition unit 1563A, and outputs the result to the operation unit 1565A. The output of the delay unit 1564A is an output in which all the past outputs of the operation unit 1562A are added together. The operation unit 1565A outputs a remainder given by dividing an output of the addition unit 1563A by 2π.

The addition unit 1566A adds an output of the operation unit 1565A to the average (a) of current phase errors input from the operation unit 1533A, and outputs the result. The operation unit 1567A outputs a remainder given by dividing an output of the addition unit 1566A by 2π. The output of the operation unit 1567A of the unwrap unit 1534A is assumed to be a carrier phase θe'.

The operation unit 1535A of the carrier phase recovery unit 1530A calculates a compensation value by which a digital signal input from the frequency offset compensation unit 1520A is multiplied, based on an output (the carrier phase θe') of the unwrap unit 1534A.

The multiplication unit 1536A multiplies a digital signal input from the frequency offset compensation unit 1520A by the compensation value calculated in the operation unit 1535A. This removes a carrier phase from the digital signal.

The residual frequency offset detection unit 1540A calculates a frequency offset (residual frequency offset) that has not been removed by the frequency offset compensation unit 1520A. If the carrier phase θe' calculated in the carrier phase recovery unit 1530A varies in time, it is considered that the signal point does not remain stationary on the complex plane. The residual frequency offset detection unit 1540A calculates an amount by which the carrier phase θe' varies in time, as a residual frequency offset.

The equalization unit 1541A detects a phase difference between symbols, excludes a bit-error phase skip, and performs lane equalization.

Figure 6:
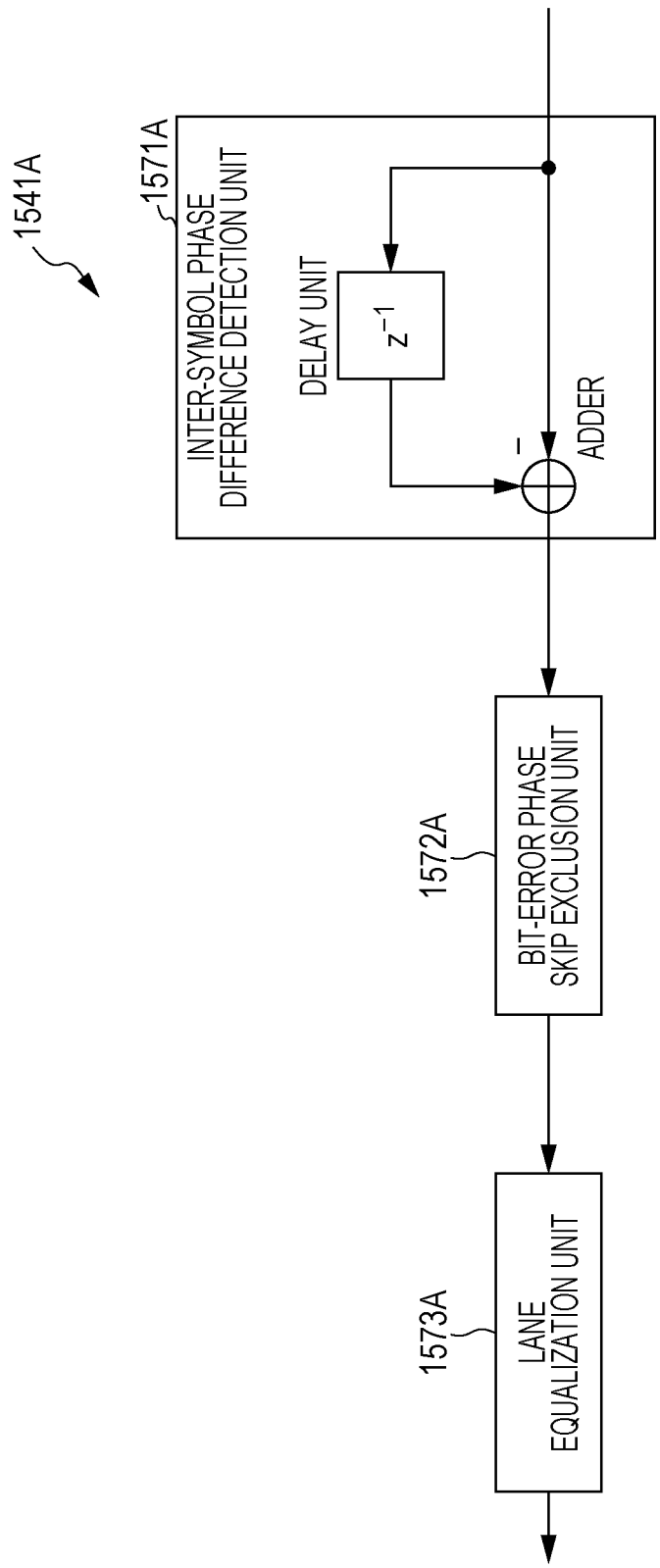
FIG. 6 is a block diagram illustrating an example of an equalization unit.

FIG. 6 is a block diagram illustrating an example of an equalization unit. The equalization unit 1541A of FIG. 6 includes an inter-symbol phase difference detection unit 1571A, a bit-error phase skip exclusion unit 1572A, and a lane equalization unit 1573A.

The inter-symbol phase difference detection unit 1571A detects a residual frequency offset component by calculating, using the carrier phase θe', a difference between the carrier phase θe' and the carrier phase of the immediately preceding symbol. The carrier phase for every symbol is input to the inter-symbol phase difference detection unit 1571A. The carrier phase for every symbol is also input to a delay unit. The delay unit delays an input signal and outputs the delayed signal to an adder. The adder calculates a difference between the carrier phase of a symbol input to the inter-symbol phase difference detection unit 1571A and the carrier phase of the immediately preceding symbol input from the delay unit, and outputs the difference.

The bit-error phase skip exclusion unit 1572A detects a phase skip that occurs in the carrier phase recovery unit 1530A, and corrects the difference calculated in the inter-symbol phase difference detection unit 1571A in accordance with a predetermined manner. The bit-error phase skip exclusion unit 1572A corrects the difference using any of the following methods (1) to (3). The bit-error phase skip of a difference is excluded by this processing.

(1) It is determined whether the absolute value of a difference exceeds $\pi/4$. If the absolute value of the difference exceeds $\pi/4$, the difference is changed to zero. If the absolute value of the difference does not exceed $\pi/4$, the difference is not changed.

(2) It is determined whether the absolute value of a difference exceeds $\pi/4$. If the absolute value of the difference exceeds $\pi/4$, the difference is changed to the immediately preceding difference. If the absolute value of the difference does not exceed $\pi/4$, the difference is not changed. At this point, the bit-error phase skip exclusion unit 1572A stores the current difference, as the immediately preceding difference to be used for the next determination, in a buffer or the like.

(3) It is determined whether a difference exceeds $\pi/4$. If the difference exceeds $\pi/4$, the difference is changed to a predetermined positive value. It is further determined whether the difference is less than $-\pi/4$. If the difference is less than $-\pi/4$, the difference is changed to a predetermined negative value. If the absolute value of the difference does not exceed $\pi/4$, the difference is not changed.

The output (carrier phase) by the unwrap unit 1534A is adjusted so as to be within a range from zero to $2\pi$. Therefore, the difference between the carrier phase of one symbol and the carrier phase of a symbol immediately preceding the symbol concerned may have a large value that is not a phase difference between the symbols. It is decided that the phase difference between symbols is $\pm\pi/4$ except for the residue processing performed by the unwrap unit 1534A. Accordingly, if the absolute value of a difference in carrier phase exceeds $\pi/4$, the bit-error phase skip exclusion unit 1572A assumes that a bit error phase skip has occurred, and performs predetermined processing as mentioned above on the difference.

The absolute value of the difference in carrier phase in which a bit-error phase skip has occurred is considered to be a value greater than the originally intended value. Accordingly, when the difference concerned is used as it is in equalization processing, there is a possibility that the residual frequency offset may become larger than the actual value. With the residual frequency offset detection unit 1540A, suitable equalization of a difference in carrier phase may be achieved by performing bit-error phase skip exclusion.

The lane equalization unit 1573A removes a noise component by performing block averaging of residual offset components among a plurality of symbols. The lane equalization unit 1573A buffers a predetermined number of outputs (differences) of the bit-error phase skip exclusion unit 1572A, and calculates and outputs the average of the predetermined number of outputs. Therefore, the lane equalization unit 1573A may reduce the output rate to a subsequent loop filter.

The equalization unit 1541A thus calculates a variation in the carrier phase calculated by the carrier phase recovery unit 1530A in a predetermined time period. The variation in carrier phase corresponds to a residual frequency offset.

The narrow-band loop filter 1542A removes a noise component and a frequency fluctuation of a specific band by applying a bandlimited filter to an output of the equalization unit 1541A. The output of the narrow-band loop filter 1542 is input as a residual frequency offset to the frequency offset compensation unit 1520A.

(Operation Example)

Figure 7:
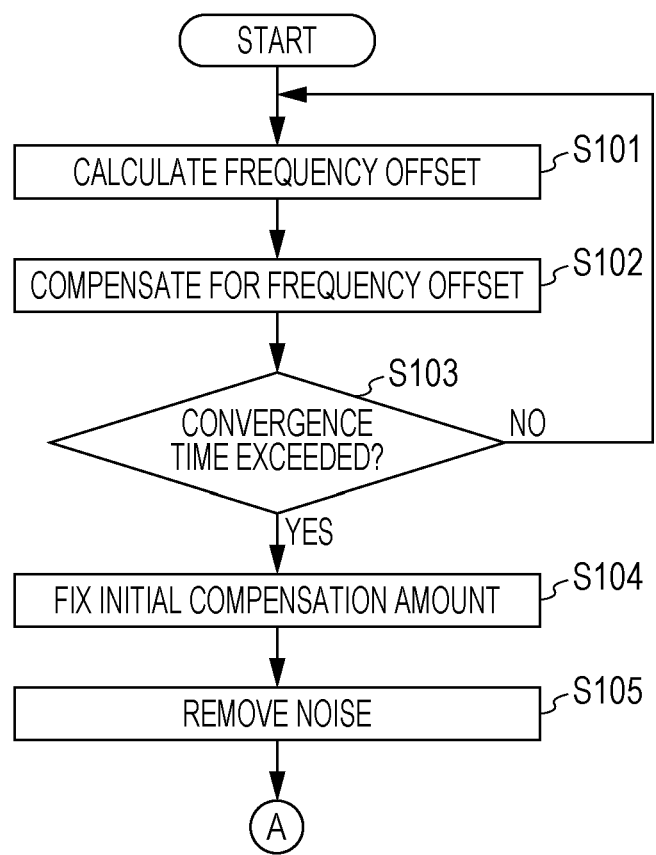
FIG. 7 is a flowchart illustrating an example of an operation flow (1/2) of the frequency offset compensation unit, the carrier phase recovery unit, and the residual frequency offset detection unit.
Figure 8:
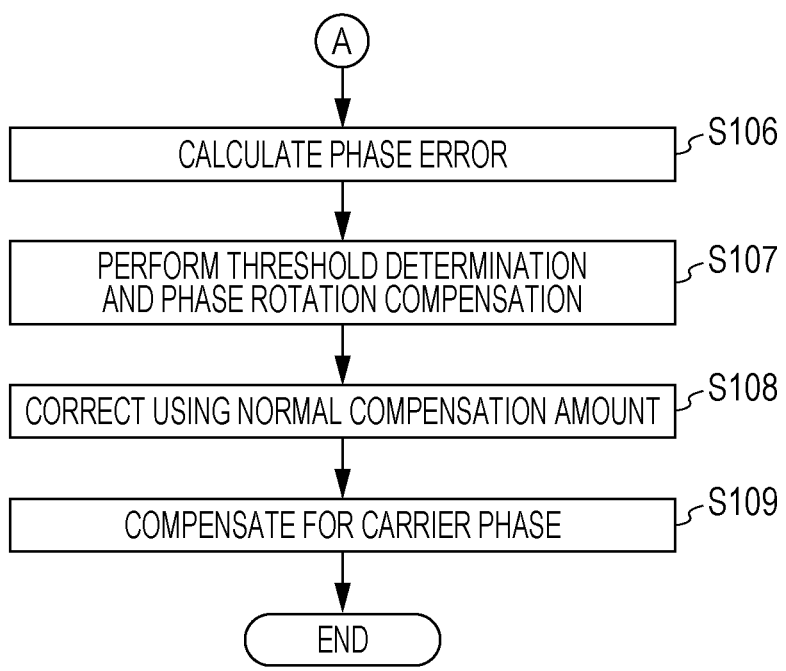
FIG. 8 is a flowchart illustrating an example of the operation flow (2/2) of the frequency offset compensation unit, the carrier phase recovery unit, and the residual frequency offset detection unit.

FIG. 7 and FIG. 8 are flowcharts illustrating an example of an operation flow of the frequency offset compensation unit 1520A, the carrier phase recovery unit 1530A, and the residual frequency offset detection unit 1540A. The operation flow of FIG. 7 and FIG. 8 starts by inputting a digital signal from the distortion equalization unit 1510 to the frequency offset compensation unit 1520A.

At step S101, the initial FOE 1521A of the frequency offset compensation unit 1520A buffers a received signal (digital signal) input from the distortion equalization unit 1510, and calculates a frequency offset. The frequency offset is a shift in frequency between the received signal and laser light emitted by the local oscillator 110.

At step S102, the operation unit 1523A of the frequency offset compensation unit 1520A calculates a compensation value by which the digital signal input from the distortion equalization unit 1510 is multiplied, based on the frequency offset calculated at step S101. The multiplication unit 1524A multiplies the digital signal input from the distortion equalization unit 1510 by the compensation value calculated in the operation unit 1523A.

At step S103, the initial FOE 1521A of the frequency offset compensation unit 1520A determines whether a predetermined time period (predetermined convergence time) has elapsed since the process started. If the convergence time of processing has not elapsed (S103; NO), the process returns to step S101. If the predetermined convergence time has elapsed (S103; YES), the process proceeds to step S104.

At step S104, the initial FOE 1521A of the frequency offset compensation unit 1520A fixes a frequency offset finally calculated at step S101, and assumes the frequency offset as an initial compensation amount.

At step S105, the operation unit 1531A of the carrier phase recovery unit 1530A raises a digital signal from the frequency offset compensation unit 1520A to the fourth power for every symbol, and multiplies the result by $-1$ ($=\exp(\text{in})$). As a result, modulation information is removed. The operation unit 1532A of the carrier phase recovery unit 1530A integrates outputs of the operation unit 1531A for the immediately preceding N symbols. The operation unit 1532A outputs an integration result for every symbol. By integrating outputs of the operation unit 1531A for the N symbols, noise of phase errors is removed.

At step S106, the operation unit 1533A of the carrier phase recovery unit 1530A calculates the deviation angle of an output of the operation unit 1532A, and quarters the calculated deviation angle, so that the average of phase errors $\theta e$ is calculated. The operation unit 1533A calculates the average of phase errors $\theta e$ for every symbol.

At step S107, the unwrap unit 1534A of the carrier phase recovery unit 1530A performs a determination using $\pm\pi/4$ thresholds of a difference between the average of the immediately preceding phase errors and the average of the current phase errors, and calculates the carrier phase $\theta e'$ in which $\pm\pi/2$ phase rotation is compensated for.

At step S108, the residual frequency offset detection unit 1540A calculates a residual frequency offset using the carrier phase $\theta e'$ for every symbol calculated by the carrier phase recovery unit 1530A. The residual frequency offset is added to the initial compensation amount in the frequency offset compensation unit 1520A to thereby be used as a value for adjusting a frequency offset compensation value.

At step S109, the operation unit 1535A of the carrier phase recovery unit 1530A calculates a compensation value by which a digital signal input from the frequency offset compensation unit 1520A is multiplied, based on the carrier phase θe', which is an output of the unwrap unit 1534A. The multiplication unit 1536A of the carrier phase recovery unit 1530A multiplies a digital signal input from the frequency offset compensation unit 1520A by the compensation value calculated in the operation unit 1535A to compensate for a carrier phase contained in the digital signal. As a result, the carrier phase contained in the digital signal input from the frequency offset compensation unit 1520A is removed. The digital signal from which the carrier phase has been removed is output to the identification determination unit 1550.

A series of operations may be performed by hardware, and may also be performed by software. The steps describing a program include, of course, not only operations performed chronologically in order of description, but also operations that are not necessarily performed chronologically but are performed in parallel or individually.

(Modification 1)

Here, a modification of the equalization unit will be described. The configurations of elements other than the equalization unit are similar to the above configurations.

Figure 9:
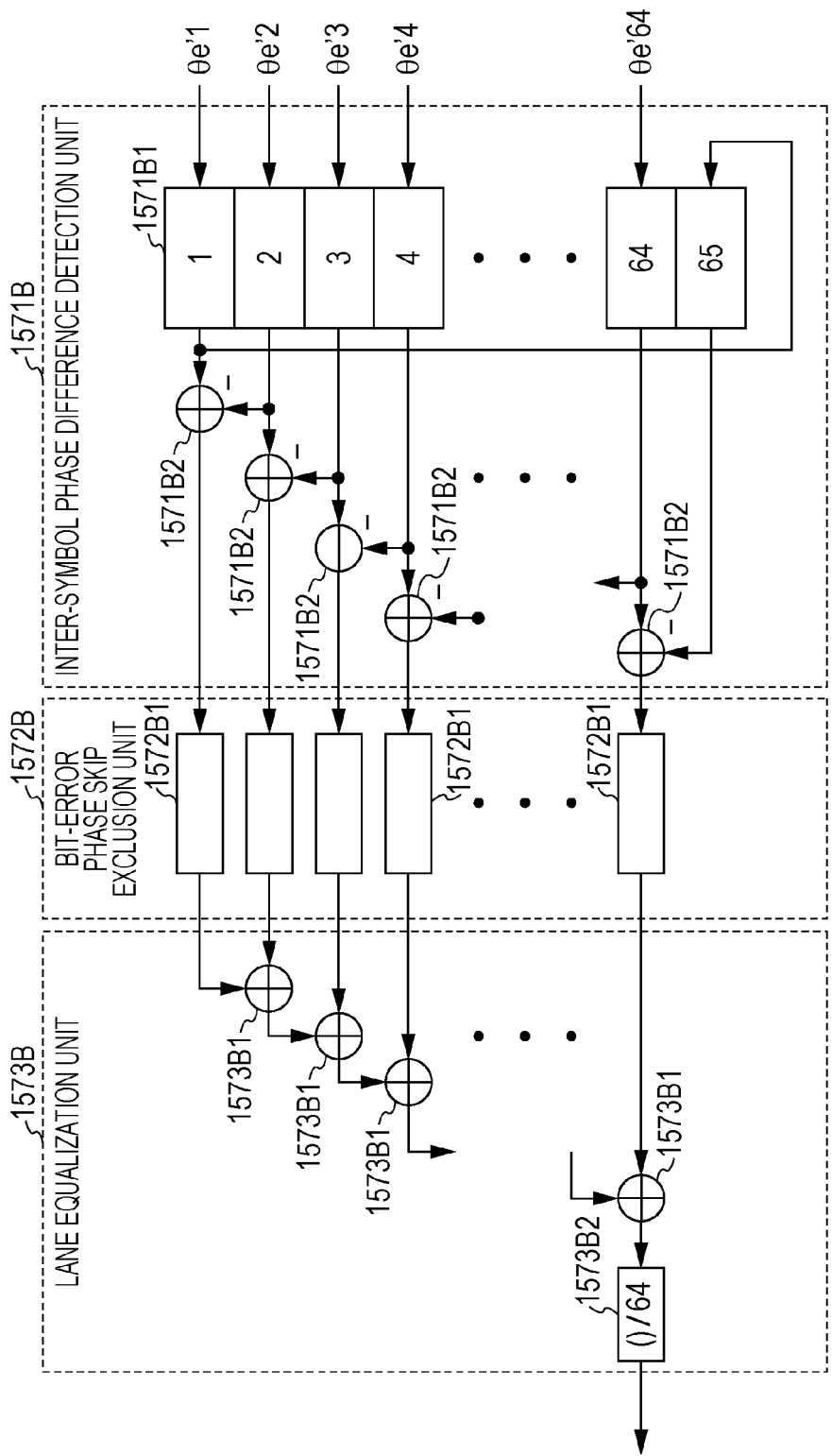
FIG. 9 is a block diagram illustrating a modification of the equalization unit.

FIG. 9 is a block diagram illustrating a modification of the equalization unit. An equalization unit 1541B of FIG. 9 includes an inter-symbol phase difference detection unit 1571B, a bit-error phase skip exclusion unit 1572B, and a lane equalization unit 1573B. Although the processing performed by the equalization unit 1541A is serial operation processing, processing performed by the equalization unit 1541B is parallel operation processing.

The inter-symbol phase difference detection unit 1571B is provided with a plurality of buffers that store carrier phases calculated in the carrier phase recovery unit 1530. In the example of FIG. 9, buffers 1571B1 capable of storing 65 carrier phases are provided. A carrier phase for every symbol is input to the inter-symbol phase difference detection unit 15716. The inter-symbol phase difference detection unit 1571B stores carrier phases denoted as $\theta e'_{64}$, $\theta e'_{63}$, ..., $\theta e'_1$ in chronological order from the earliest to the latest to the buffers 1571B1. The latest carrier phase stored in the buffer 1571B1 is $\theta e'_1$. The carrier phase of a symbol (time point) immediately preceding $\theta e'_{64}$ is also stored in the inter-symbol phase difference detection unit 1571B. The inter-symbol phase difference detection unit 1571B calculates a difference between the carrier phase of each symbol and the carrier phase of a symbol immediately preceding the symbol concerned by using the adder 1571B2. The calculated difference is input to the bit-error phase skip exclusion unit 1572B.

The bit-error phase skip exclusion unit 1572B detects a phase skip of a carrier phase that occurs in the carrier phase recovery unit 1530, and corrects each difference calculated in the inter-symbol phase difference detection unit 1571B in accordance with a predetermined manner, by using operators 1572B1. The operators 1572B1 of the bit-error phase skip exclusion unit 1572B correct differences using the same method as the bit-error phase skip exclusion unit 1572A.

The lane equalization unit 15736 adds the differences corrected by the bit-error phase skip exclusion unit 1572B by using adders 1573B1, and calculates the average of differences by an operator 1573B2. The lane equalization unit 1573B calculates the average of outputs of the bit-error phase skip exclusion unit 1572B.

With the equalization unit 1541B, operation processing is performed in parallel, which reduces the time period of processing as compared with processing performed by the equalization unit 1541A.

(Modification 2)

Here, a configuration in which the initial FOE is of a feed-back type will be described. Modification 2 has commonalities with the aforementioned configuration example, modification 1, and so forth. The differences will be primarily described here.

Figure 10:
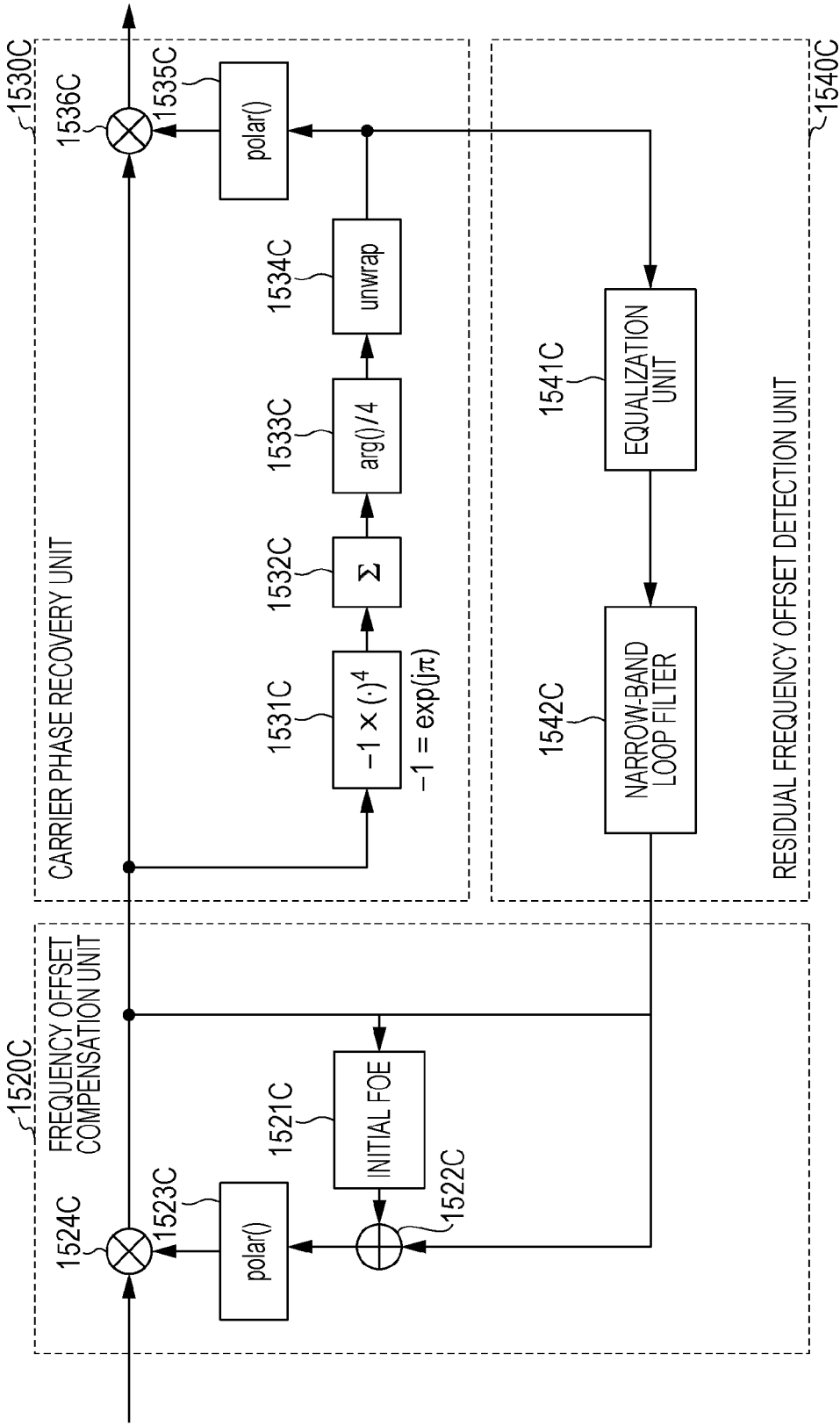
FIG. 10 is a block diagram illustrating a specific configuration example (2) of the frequency offset compensation unit, the carrier phase recovery unit, and the residual frequency offset detection unit in the digital signal processing unit.

FIG. 10 is a block diagram illustrating a specific configuration example (2) of the frequency offset compensation unit, the carrier phase recovery unit, and the residual frequency offset detection unit in the digital signal processing unit. In the configuration example (2) of FIG. 10, a frequency offset compensation unit 1520C includes an initial FOE 1521C, an adder 1522C, an operation unit 1523C, and a multiplication unit 1524C. The carrier phase recovery unit 1530C includes an operation unit 1531C, an operation unit 1532C, an operation unit 1533C, an unwrap unit 1534C, an operation unit 1535C, and a multiplication unit 1536C. The residual frequency offset detection unit 1540C includes an equalization unit 1541C and a narrow-band loop filter 1542C. The frequency offset compensation unit 1520C, the carrier phase recovery unit 1530C, and the residual frequency offset detection unit 1540C are examples of the frequency offset compensation unit 1520, the carrier phase recovery unit 1530, and the residual frequency offset detection unit 1540, respectively. The configurations of the carrier phase recovery unit 1530C and the residual frequency offset detection unit 1540C are similar to the configurations of the carrier phase recovery unit 1530A and the residual frequency offset detection unit 1540A, respectively.

The frequency offset compensation unit 1520C calculates a frequency offset compensation value, based on a frequency offset calculated by the initial FOE 1521C and a residual frequency offset calculated by the residual frequency offset detection unit 1540C. The frequency offset compensation unit 1520C restrains rotation of a digital signal on the complex plane by multiplying the digital signal by the frequency offset compensation value.

The initial FOE 1521C buffers a signal output from the multiplication unit 1524C and calculates a shift in frequency (frequency offset) between the signal concerned and the local oscillator. The initial FOE 1521C is, for example, a feed-back FOE, such as PADE vector. The frequency offset calculated by the FOE 1521A is fixed after a predetermined time period has elapsed since the calculation started.

The adder 1522C, the operation unit 1523C, and the multiplication unit 1524C are similar to the adder 1522A, the operation unit 1523A, and the multiplication unit 1524A respectively.

(Modification 3)

Here, the case where a wide-band loop filter is included will be described. Modification 3 has commonalities with the foregoing configuration example, modifications 1 and 2, and so forth. The differences will be primarily described here.

Figure 11:
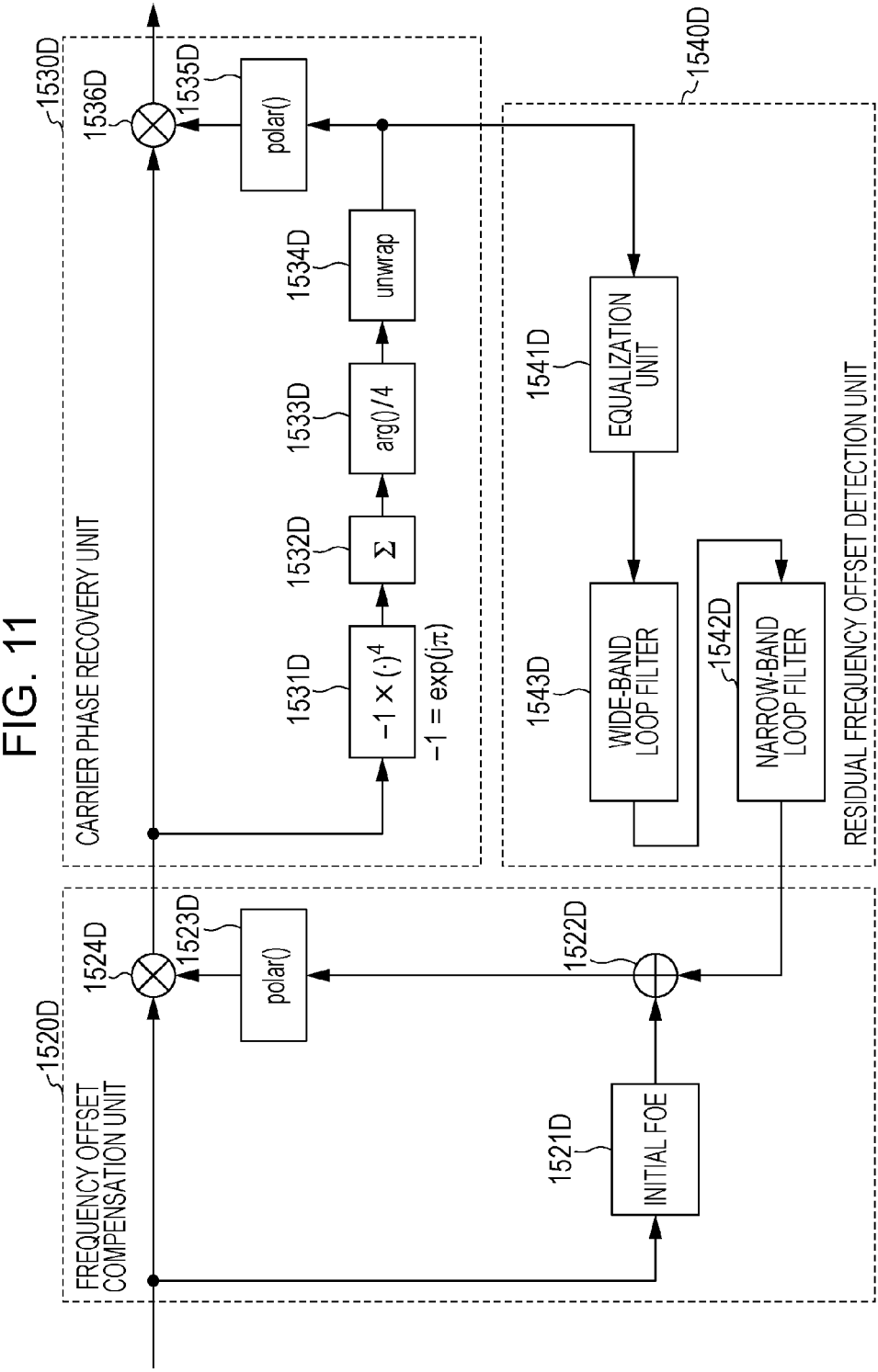
FIG. 11 is a block diagram illustrating a specific configuration example (3) of the frequency offset compensation unit, the carrier phase recovery unit, and the residual frequency offset detection unit in the digital signal processing unit.

FIG. 11 is a block diagram illustrating a specific configuration example (3) of the frequency offset compensation unit, the carrier phase recovery unit, and the residual frequency offset detection unit in the digital signal processing unit. In the configuration example (3) of FIG. 11, a frequency offset compensation unit 1520D includes an initial FOE 1521D, an adder 1522D, an operation unit 1523D, and a multiplication unit 1524D. The carrier phase recovery unit 1530D includes an operation unit 1531D, an operation unit 1532D, an operation unit 1533D, an unwrap unit 1534D, an operation unit 1535D, and a multiplication unit 1536D. The residual frequency offset detection unit 1540D includes an equalization unit 1541D, a wide-band loop filter 1543D, and a narrow-band loop filter 1542D. The frequency offset compensation unit 1520D, the carrier phase recovery unit 1530D, and the residual frequency offset detection unit 1540D are examples of the frequency offset compensation unit 1520, the carrier phase recovery unit 1530, and the residual frequency offset detection unit 1540, respectively. The configurations of the frequency offset compensation unit 1520D and the carrier phase recovery unit 1530D are similar to the configurations of the frequency offset compensation unit 1520A and the carrier phase recovery unit 1530A, respectively.

The residual frequency offset detection unit 1540D calculates a frequency offset (residual frequency offset) that has not been removed in the frequency offset compensation unit 1520D.

The equalization unit 1541D is similar to the equalization unit 1541A. The output of the equalization unit 1541D is input to the wide-band loop filter 1543D.

The wide-band loop filter 1543D applies a bandlimited filter to a signal output from the equalization unit 1541D. The wide-band loop filter 1543D removes an FM modulation component and so on that are superimposed on the signal output from the equalization unit 1541D.

The narrow-band loop filter 1542D is similar to the narrow-band loop filter 1542A. The narrow-band loop filter 1542D may be omitted.

Figure 12:
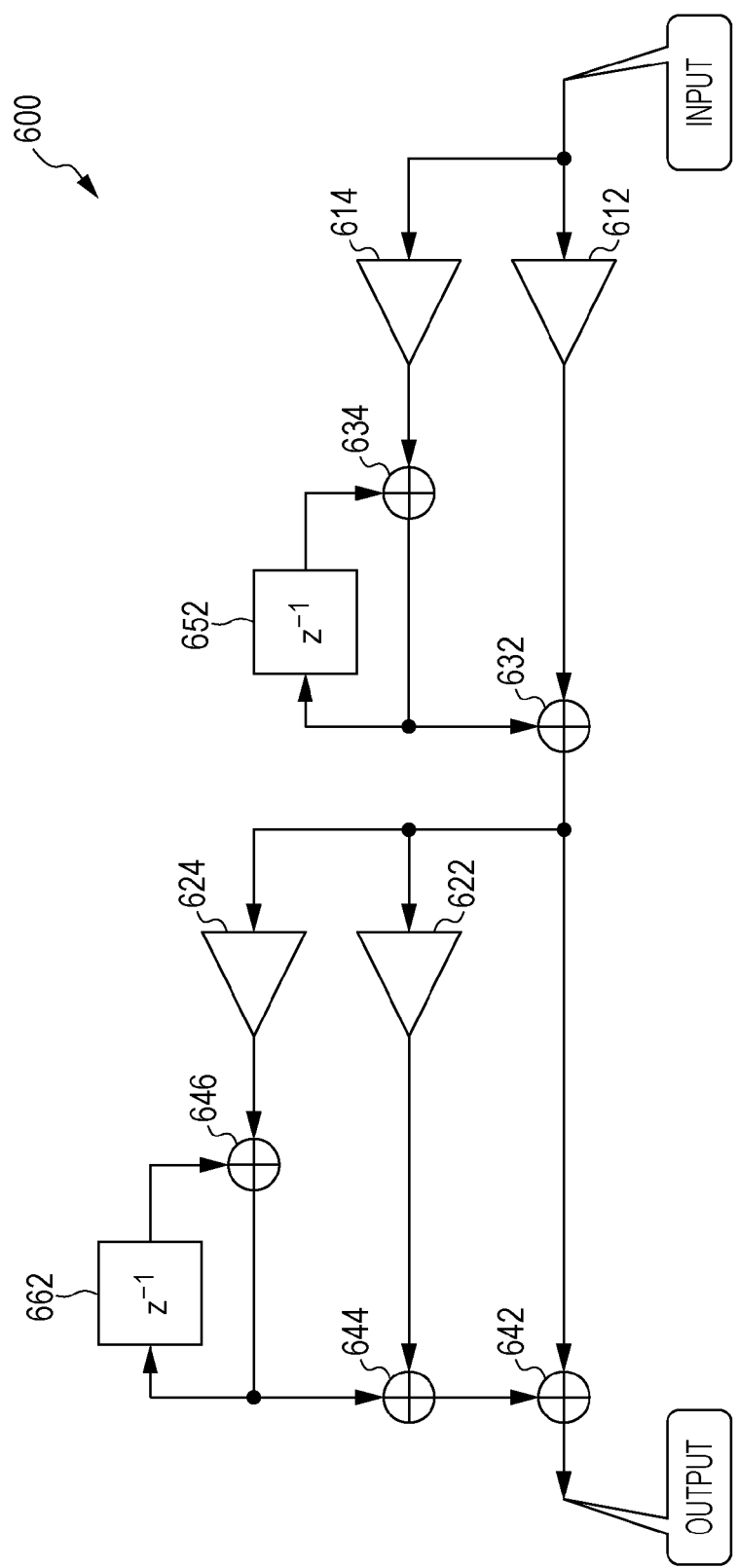
FIG. 12 is a circuit diagram illustrating an example of a configuration of a loop filter.

FIG. 12 is a circuit diagram illustrating an example of a configuration of a loop filter. A loop filter 600 of FIG. 12 includes an amplifier 612, an amplifier 614, an adder 632, an adder 634, a delay unit 652, an amplifier 622, an amplifier 624, an adder 642, an adder 644, an adder 646, and a delay unit 662. By adjusting gains of amplifiers, the loop filter of FIG. 12 operates as a wide-band loop filter, or operates as a narrow-band loop filter. For example, the loop filter 600 operates as a filter with a cutoff frequency of 1.2 MHz by setting the gain of the amplifier 612 to 0.005, the gain of the amplifier 614 to 0.015, the gain of the amplifier 622 to 0, and the gain of the amplifier 624 to 0. The loop filter 600 also operates as a filter with a cutoff frequency of 12 kHz by setting the gain of the amplifier 612 to 0.005, the gain of the amplifier 614 to 0.000015, the gain of the amplifier 622 to 0, and the gain of the amplifier 624 to 0. Of these two kinds of filters, the former is a wide-band loop filer and the latter is a narrow-band loop filter.

The loop filters (the narrow-band loop filter and the wide-band loop filter) in this embodiment is not limited to the example of FIG. 12, and may have any configurations if the configurations are capable of removing a phase variation that is superimposed on a signal and is to be removed.

With the loop filters that limit bands, a noise component of a signal and a frequency fluctuation of a specific band may be removed.

(Modification 4)

Here, the case where another processing unit is included at a position subsequent to the frequency offset compensation unit will be described. Modification 4 has commonalities with the foregoing configuration example, modifications 1 to 3, and so forth. The differences will be primarily described here.

Figure 13:
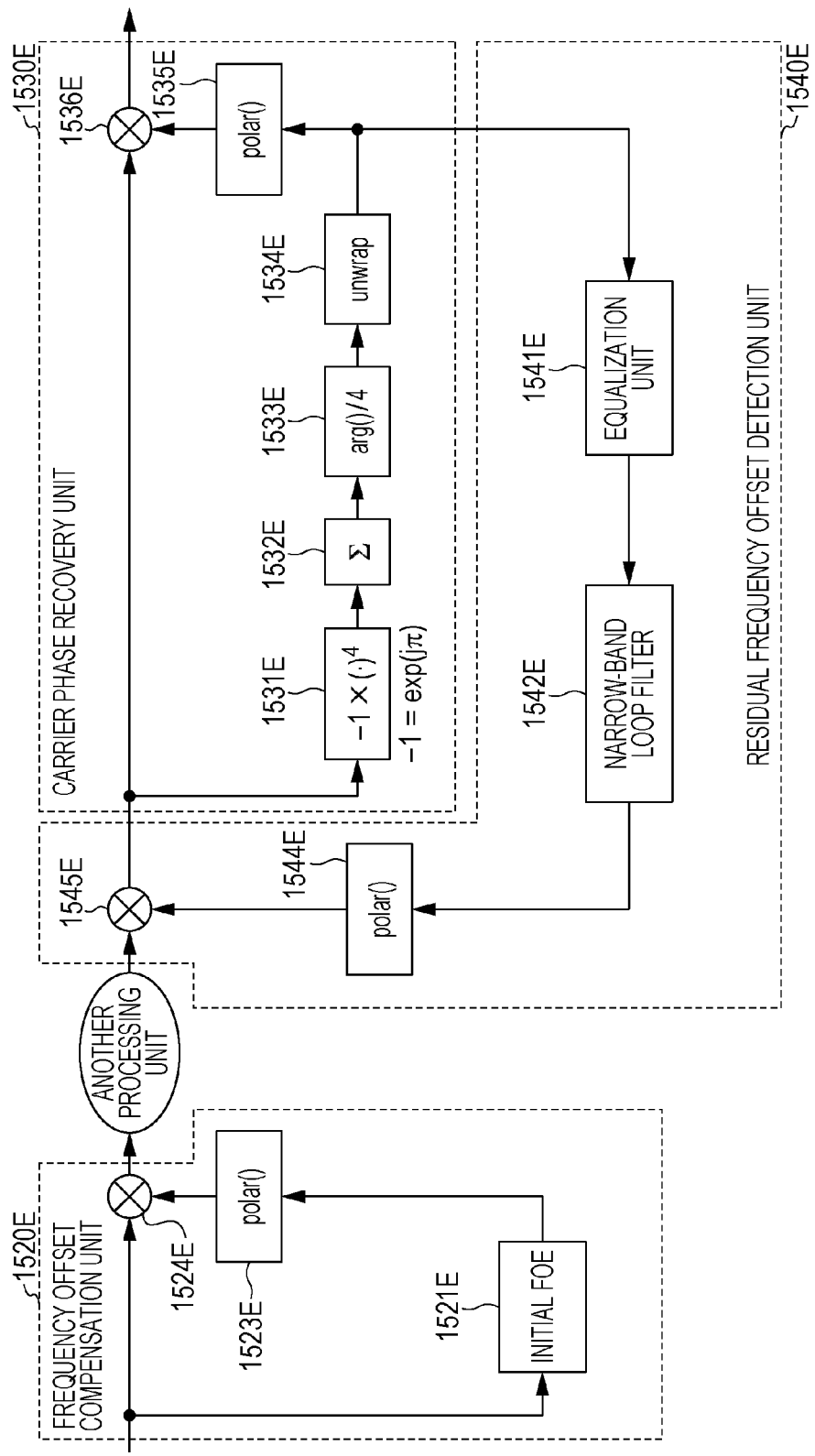
FIG. 13 is a block diagram illustrating a specific configuration example (4) of the frequency offset compensation unit, the carrier phase recovery unit, and the residual frequency offset detection unit in the digital signal processing unit.

FIG. 13 is a block diagram illustrating a specific configuration example (4) of the frequency offset compensation unit, the carrier phase recovery unit, and the residual frequency offset detection unit in the digital signal processing unit. In the configuration example (4) of FIG. 13, a frequency offset compensation unit 1520E includes an initial FOE 1521E, an operation unit 1523E, and a multiplication unit 1524E. The carrier phase recovery unit 1530E includes an operation unit 1531E, an operation unit 1532E, an operation unit 1533E, an unwrap unit 1534E, an operation unit 1535E, and a multiplication unit 1536E. The residual frequency offset detection unit 1540E includes an equalization unit 1541E, a narrow-band loop filter 1542E, an operation unit 1544E, and a multiplication unit 1545E. The frequency offset compensation unit 1520E, the carrier phase recovery unit 1530E, and the residual frequency offset detection unit 1540E are examples of the frequency offset compensation unit 1520, the carrier phase recovery unit 1530, and the residual frequency offset detection unit 1540, respectively. The configuration of the carrier phase recovery unit 1530E is similar to the configuration of the carrier phase recovery unit 1530A.

The frequency offset compensation unit 1520E calculates a frequency offset compensation value based on a frequency offset calculated by the initial FOE 1521E. The frequency offset compensation unit 1520E restrains rotation of a digital signal on the complex plane by multiplying the digital signal by a frequency offset compensation value.

The initial FOE 1521E buffers a received signal and calculates a shift in frequency (frequency offset) between the received signal and the local oscillator. The initial FOE 1521E is, for example, a feed-forward FOE, such as PADE vector. The frequency offset calculated by the initial FOE 1521E is fixed after a predetermined time period has elapsed since the calculation started.

Based on the frequency offset calculated in the initial FOE 1521E, the operation unit 1523E calculates a compensation value by which a digital signal input from the distortion equalization unit 1510 is to be multiplied.

The multiplication unit 1524E multiplies a digital signal input from the distortion equalization unit 1510 by the compensation value calculated in the operation unit 1523E.

Another processing unit may be inserted at a position subsequent to the frequency offset compensation unit 1520E. Another processing unit is, for example, a phase compensation unit using a reference symbol.

The residual frequency offset detection unit 1540E calculates a frequency offset (residual frequency offset) that has not been removed in the frequency offset compensation unit 1520E, and multiplies an output signal of the other processing unit subsequent to the frequency offset compensation unit 1520E.

The configurations of the equalization unit 1541E and the narrow-band loop filter 1542E are similar to the configurations of the equalization unit 1541A and the narrow-band loop filter 1542A, respectively. A signal output from the narrow-band loop filter 1542E is input to the operation unit 1544E.

Based on the signal output from the narrow-band loop filter 1542E, the operation unit 1544E calculates a compensation value by which an output signal (digital signal) of the other processing unit subsequent to the frequency offset compensation unit 1520E is to be multiplied.

The multiplication unit 1545E multiplies the output signal from the other processing unit subsequent to the frequency offset compensation unit 1520E by the compensation value calculated in the operation unit 1544E. The signal after the multiplication is input to the carrier phase recovery unit 1530E.

Insertion of the other processing unit at a position subsequent to the frequency offset compensation unit 1520E makes it possible to more appropriately remove a phase variation superimposed on a digital signal.

(Modification 5)

Here, the case where amplitude information is extracted in the carrier phase recovery unit will be described. Modification 5 has commonalities with the foregoing configuration example, modifications 1 to 4, and so forth. The differences will be primarily described here.

Figure 14:
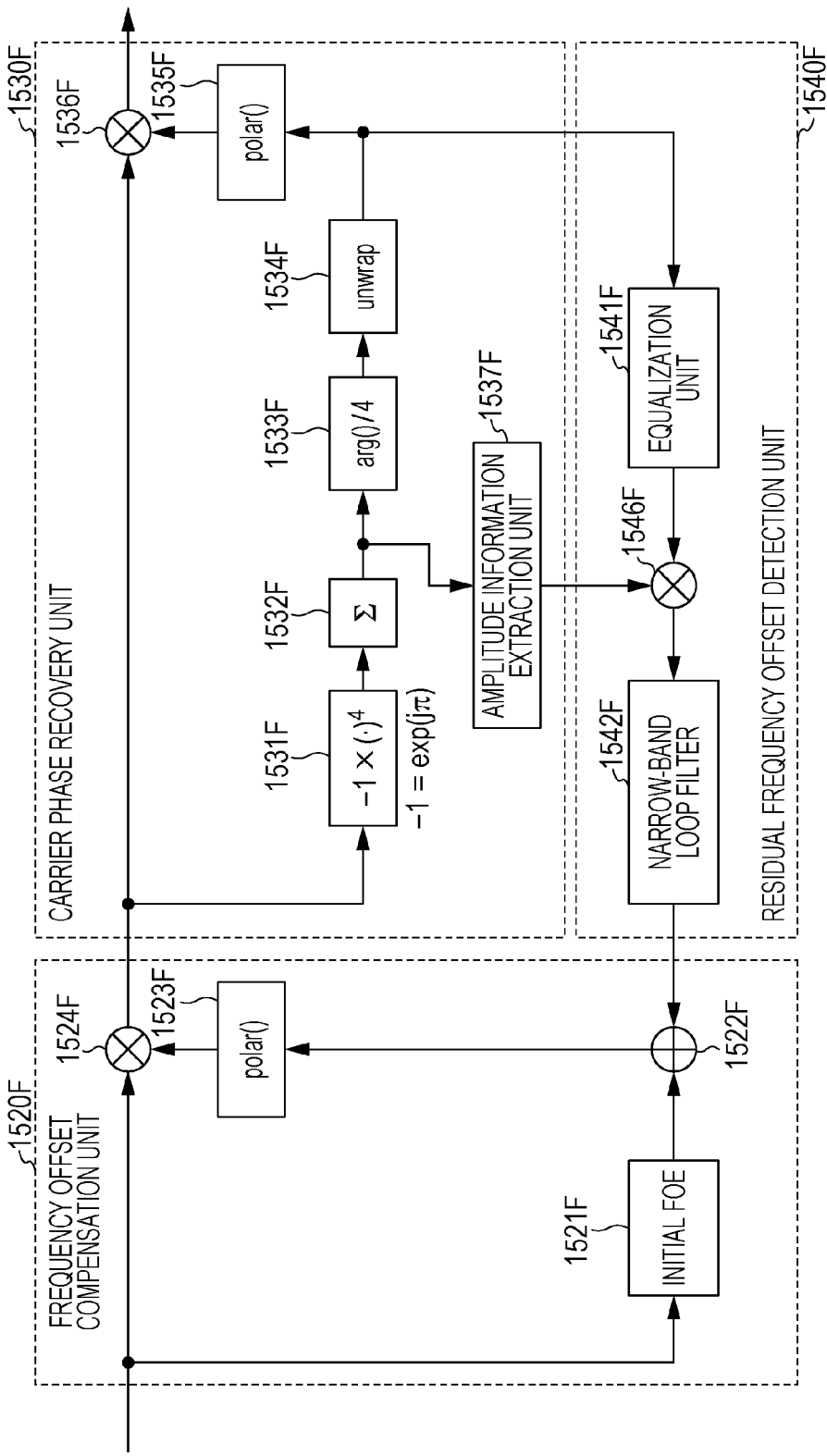
FIG. 14 is a block diagram illustrating a specific configuration example (5) of the frequency offset compensation unit, the carrier phase recovery unit, and the residual frequency offset detection unit in the digital signal processing unit.

FIG. 14 is a block diagram illustrating a specific configuration example (5) of the frequency offset compensation unit, the carrier phase recovery unit, and the residual frequency offset detection unit in the digital signal processing unit. In the configuration example (5) of FIG. 14, a frequency offset compensation unit 1520F includes an initial FOE 1521F, an adder 1522F, an operation unit 1523F, and a multiplication unit 1524F. The carrier phase recovery unit 1530F includes an operation unit 1531F, an operation unit 1532F, an operation unit 1533F, an unwrap unit 1534F, an operation unit 1535F, a multiplication unit 1536F, and an amplitude information extraction unit 1537F. The residual frequency offset detection unit 1540F includes an equalization unit 1541F, a narrow-band loop filter 1542F, and a multiplication unit 1546F. The frequency offset compensation unit 1520F, the carrier phase recovery unit 1530F, and the residual frequency offset detection unit 1540F are examples of the frequency offset compensation unit 1520, the carrier phase recovery unit 1530, and the residual frequency offset detection unit 1540, respectively. The configuration of the frequency offset compensation unit 1520F is similar to the configuration of the frequency offset compensation unit 1520A.

The carrier phase recovery unit 1530F calculates a carrier phase from an input digital signal, and rotates the phase of the input digital signal so that the digital signal is located at a predetermined signal point (modulation point) on the complex plane. The carrier phase recovery unit 1530F outputs the carrier phase and amplitude information to the residual frequency offset detection unit 1540F.

The operation unit 1531F, the operation unit 1532F, the operation unit 1533F, the unwrap unit 1534F, the operation unit 1535F, and the multiplication unit 1536F are similar to the corresponding processing units of the carrier phase recovery unit 1530A, respectively.

The amplitude information extraction unit 1537F extracts the average of signal amplitudes for every symbol from an operation result of the operation unit 1532A. The magnitude of a signal amplitude indicates the probability of information to be fed back.

The residual frequency offset detection unit 1540F multiplies a signal output from the equalization unit 1541F by the average of amplitudes extracted in the amplitude information extraction unit 1537F. The multiplied result is output to the narrow-band loop filter 1542F.

With the configuration of modification 5, a residual frequency offset is calculated based on the magnitude of a signal amplitude and the calculated carrier phase.

(Modification 6)

Here, the case where an input signal is a BPSK signal will be described. Modification 6 has commonalities with the foregoing configuration example, modifications 1 to 5, and so forth. The differences will be primarily described here.

Figure 15:
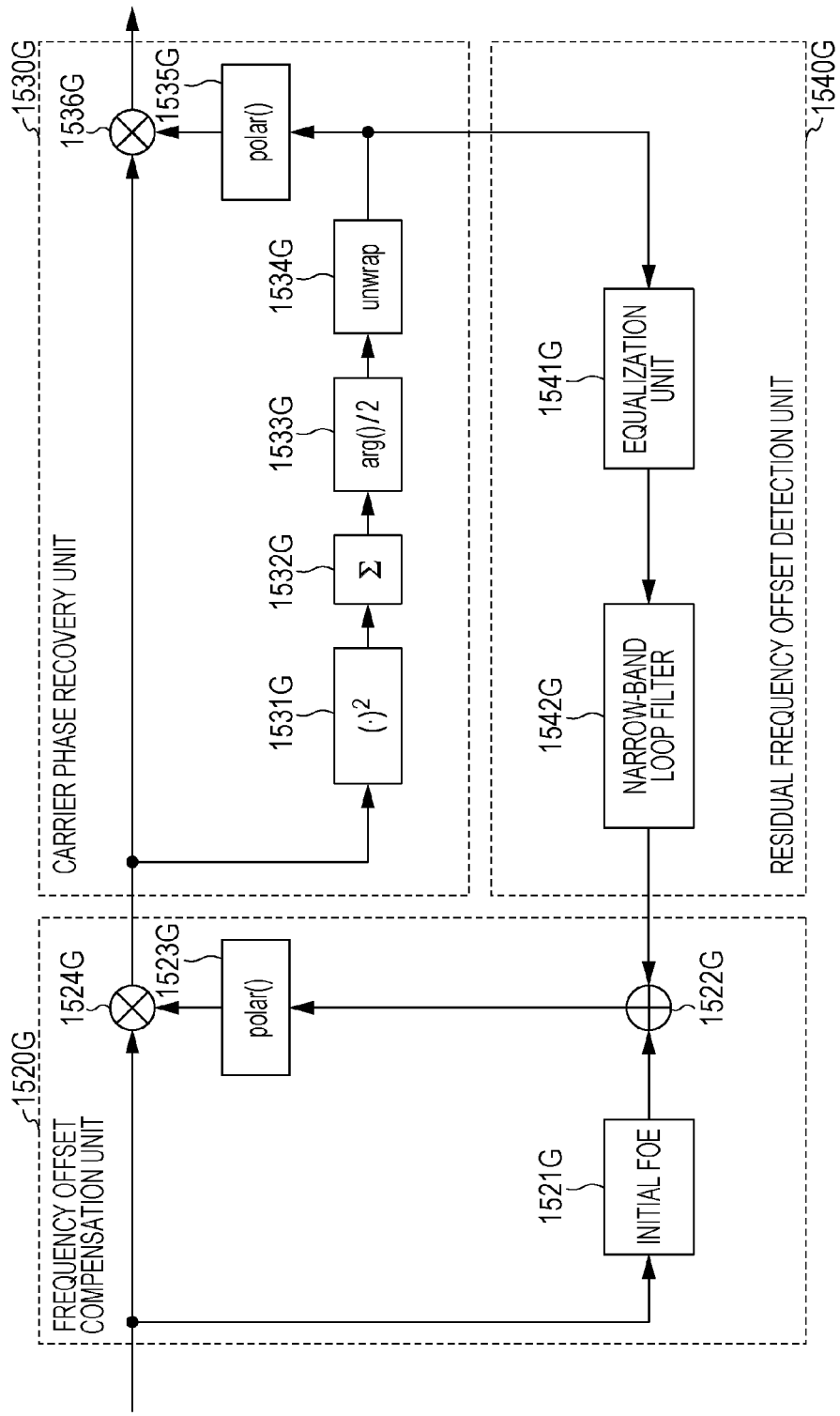
FIG. 15 is a block diagram illustrating a specific configuration example (6) of the frequency offset compensation unit, the carrier phase recovery unit, and the residual frequency offset detection unit in the digital signal processing unit.

FIG. 15 is a block diagram illustrating a specific configuration example (6) of the frequency offset compensation unit, the carrier phase recovery unit, and the residual frequency offset detection unit in the digital signal processing unit. In the configuration example (6) of FIG. 15, a frequency offset compensation unit 1520G includes an initial FOE 1521G, an adder 1522G, an operation unit 1523G, and a multiplication unit 1524G. The carrier phase recovery unit 1530G includes an operation unit 1531G, an operation unit 1532G, an operation unit 1533G, an unwrap unit 1534G, an operation unit 1535G, and a multiplication unit 1536G. The residual frequency offset detection unit 1540G includes an equalization unit 1541G and a narrow-band loop filter 1542G. The frequency offset compensation unit 1520G, the carrier phase recovery unit 1530G, and the residual frequency offset detection unit 1540G are examples of the frequency offset compensation unit 1520, the carrier phase recovery unit 1530, and the residual frequency offset detection unit 1540, respectively. The configuration of the frequency offset compensation unit 1520G is similar to the configuration of the frequency offset compensation unit 1520A.

The operation unit 1531G raises an input complex signal to the second power. Raising a BPSK signal to the second power removes modulation information (the phase rotation amount due to the modulation component of a signal).

The phase of a BPSK signal input to the operation unit 1531G is expressed using a phase error θe as follows.

$$n\pi + \theta_e, n=0,1$$

The phase of a signal output from the operation unit 1531G for this is expressed as follows.

$$2n\pi + 2\theta_e, n=0,1$$

The operation unit 1532G integrates a predetermined number (here assumed to be N) of signals output from the operation unit 1531G. The integrated value, which is an operation result of the operation unit 1532G, is calculated for each of the immediately preceding N symbols. As a result, noise of the signals output from the operation unit 1531G is removed.

The operation unit 1533G calculates the deviation angle of an output of the operation unit 1532G, and halves the calculated deviation angle. As a result, the average of phase errors θe is calculated. The average of phase errors θe is calculated for every symbol.

The operations in the operation unit 1531G, the operation unit 1532G, and the operation unit 1533G are expressed as follows.

$$\overline{\theta_e} = \frac{1}{2}\arg\left[\sum_{i=1}^{N}[I'(i)+jQ'(i)]^2\right]$$

Where I' and Q' are the I component and the Q component of a digital signal input to the carrier phase recovery unit 1530G, respectively.

Figure 16:
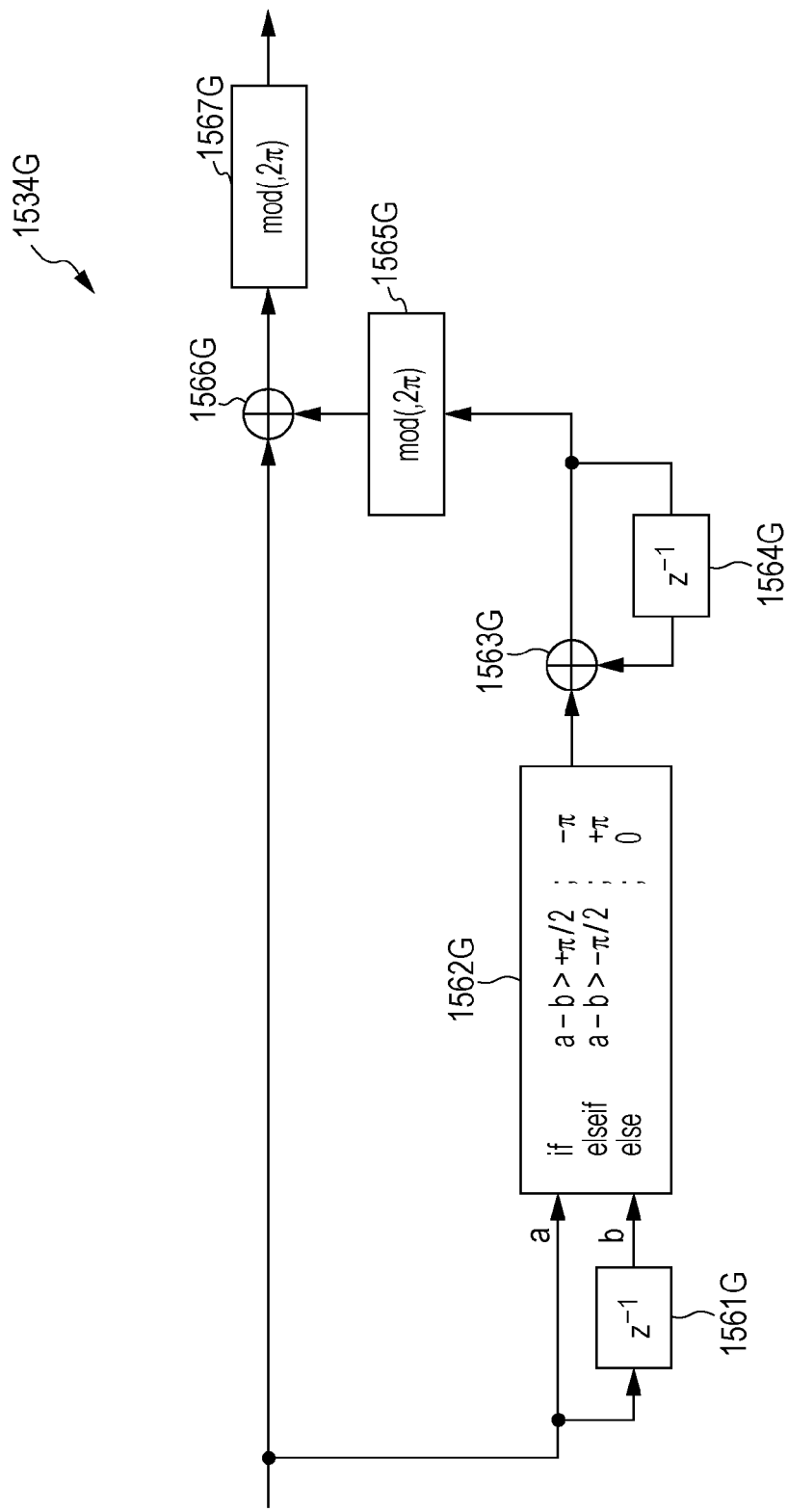
FIG. 16 is a block diagram illustrating an example of a configuration of an unwrap unit.

FIG. 16 is a block diagram illustrating an example of a configuration of an unwrap unit. The unwrap unit 1534G of FIG. 16 includes a delay unit 1561G, an operation unit 1562G, an addition unit 1563G, a delay unit 1564G, an operation unit 1565G, an addition unit 1566G, and an operation unit 1567G. The unwrap unit 1534G, except for the operation unit 1562G, is similar to the unwrap unit 1534A.

The operation unit 1562G takes a difference between the average (assumed to be a) of the current phase errors input from the operation unit 1533G and the average (assumed to be b) of the past phase errors input from the delay unit 1561G. If (a−b) is greater than +π/2, the operation unit 1562G outputs −π. If (a−b) is less than −π/2, the operation unit 1562G outputs $+\pi$. If (a−b) is equal to or less than $+\pi/2$ and is equal to or greater than $-\pi/2$, the operation unit 1562G outputs zero.

A bit-error phase skip exclusion unit of the equalization unit 1541G corrects a difference using any of the following methods (1) to (3).

(1) It is determined whether the absolute value of a difference exceeds $\pi/2$. If the absolute value of the difference exceeds $\pi/2$, the difference is changed to zero. If the absolute value of the difference does not exceed $\pi/2$, the difference is not changed.

(2) It is determined whether the absolute value of a difference exceeds $\pi/2$. If the absolute value of the difference exceeds $\pi/2$, the difference is changed to the immediately preceding difference. If the absolute value of the difference does not exceed $\pi/2$, the difference is not changed. At this point, a bit-error phase skip exclusion unit of the equalization unit 1541G stores the current difference, as the immediately preceding difference, in a buffer or the like.

(3) It is determined whether a difference exceeds $\pi/2$. If the difference exceeds $\pi/2$, the difference is changed to a predetermined positive value. It is further determined whether the difference is less than $-\pi/2$. If the difference is less than $-\pi/2$, the difference is changed to a predetermined negative value. If the absolute value of the difference does not exceed $\pi/2$, the difference is not changed.

With the frequency offset compensation unit 1520G, the carrier phase recovery unit 1530G, and the residual frequency offset detection unit 1540G, a residual frequency offset may be calculated for a BPSK signal.

(Modification 7)

Here, the case where an input signal is a 16QAM signal will be described. Modification 7 has commonalities with the foregoing configuration example, modifications 1 to 6, and so forth. The differences will be primarily described here.

Figure 17:
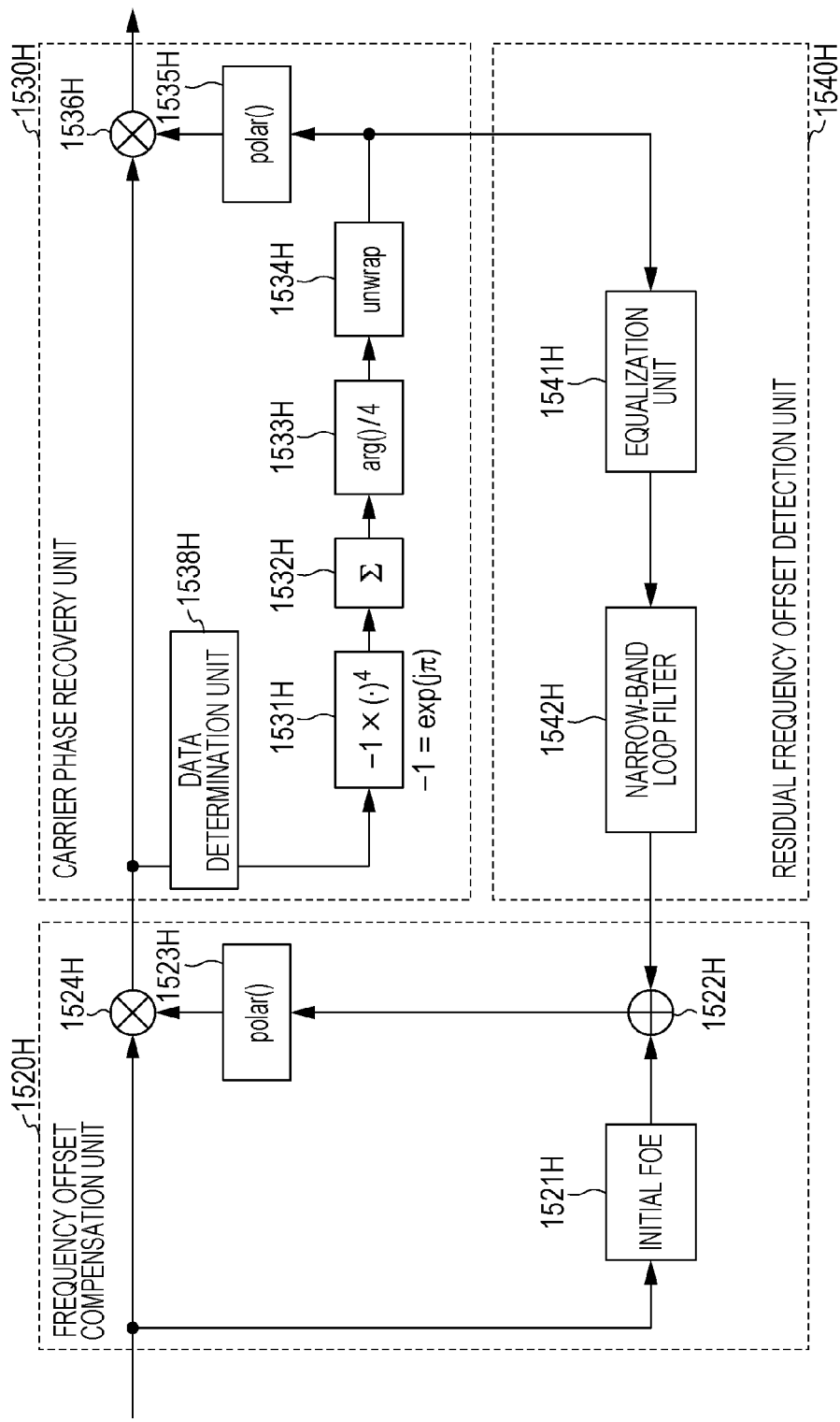
FIG. 17 is a block diagram illustrating a specific configuration example (7) of the frequency offset compensation unit, the carrier phase recovery unit, and the residual frequency offset detection unit in the digital signal processing unit.

FIG. 17 is a block diagram illustrating a specific configuration example (7) of the frequency offset compensation unit, the carrier phase recovery unit, and the residual frequency offset detection unit in the digital signal processing unit. In the configuration example (7) of FIG. 17, a frequency offset compensation unit 1520H includes an initial FOE 1521H, an adder 1522H, an operation unit 1523H, and a multiplication unit 1524H. The carrier phase recovery unit 1530H includes a data determination unit 1538H, an operation unit 1531H, an operation unit 1532H, an operation unit 1533H, an unwrap unit 1534H, an operation unit 1535H, and a multiplication unit 1536H. The residual frequency offset detection unit 1540H includes an equalization unit 1541H and a narrow-band loop filter 1542H. The frequency offset compensation unit 1520H, the carrier phase recovery unit 1530H, and the residual frequency offset detection unit 1540H are examples of the frequency offset compensation unit 1520, the carrier phase recovery unit 1530, and the residual frequency offset detection unit 1540, respectively. The configurations of the frequency offset compensation unit 1520H and the residual frequency offset detection unit 1540H are similar to the configurations of the frequency offset compensation unit 1520A and the residual frequency offset detection unit 1540A. The carrier phase recovery unit 1530H, except for the operation unit 1538H, is similar to the carrier phase recovery unit 1530A.

The data determination unit 1538H of the carrier phase recovery unit 1530H performs a threshold determination of data points of a 16QAM signal, and excludes a data point the phase angle of which is different from the phase angle of a QPSK signal. As a result, the carrier phase recovery unit 1530H may perform processing as is the case for a QPSK signal described above.

Alternatively, the data determination unit 1538H may perform a threshold determination of data points of a 16QAM signal, and rotate a data point the phase angle of which is different from the phase angle of a QPSK signal, so that the phase angle of the data point is equal to the phase angle of the QPSK signal. As a result, the carrier phase recovery unit 1530H may perform processing as is the case for a QPSK signal described above.

(Operations and Advantages of Embodiment)

The residual frequency offset detection unit 1540 detects a residual frequency offset amount with high accuracy based on carrier phases (the amount of phase compensation) from which noise components are removed by performing equalization among codes and which are calculated by the carrier phase recovery unit 1530. The residual frequency offset detection unit 1540 detects a residual frequency offset, based on a difference in carrier phase for every symbol. That is, the residual frequency offset detection unit 1540 calculates a residual frequency offset, based on a variation in the carrier phase calculated by the carrier phase recovery unit 1530. Using the residual frequency offset calculated by the residual frequency offset detection unit 1540, the frequency offset compensation unit 1520 may correct a frequency offset. The residual frequency offset is fed back to the frequency offset compensation unit 1520, so that a residual frequency offset (compensation residue) in a signal output from the frequency offset compensation unit 1520 is reduced. Thus, the number of false detections of phase errors made by the carrier phase recovery unit 1530 may be reduced, the occurrence of a phase slip may be restrained, and the transmission quality may be improved.

The residual frequency offset detection unit 1540 performs predetermined processing to exclude a phase skip by using a bit-error phase skip exclusion unit, if the absolute value of a difference in carrier phase exceeds a predetermined value. Thus, the residual frequency offset detection unit 1540 may appropriately calculate the average of differences in carrier phase (variation in carrier phase).

The identification determination unit 1550 becomes less likely to fail in error correction, and therefore the reception performance of the digital coherent optical receiver 100 may be improved (transmission errors may be reduced).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical communication receiving device that converts, to a digital signal, a signal in which signal light from an optical transmission path and local oscillation light are mixed, so as to perform digital signal processing, the optical communication receiving device comprising:

a frequency offset compensator configured to calculate a frequency offset of the digital signal and to, based on the frequency offset, compensate for a phase of the digital signal;

a carrier phase recoverer configured to calculate a carrier phase of the digital signal whose phase is compensated for in the frequency offset compensator; and a residual frequency offset detector configured to calculate an average of differences in a carrier phase of each of a plurality of symbols, and to output the average as a residual frequency offset, wherein the frequency offset compensator is configured to correct the frequency offset using the residual frequency offset output by the residual frequency offset detector, and wherein the residual frequency offset detector is configured to set a difference in the carrier phase to zero when an absolute value of the difference in the carrier phase exceeds a predetermined value.

2. The optical communication receiving device according to claim 1, wherein the residual frequency offset detector is configured to set a difference in the carrier phase to a predetermined positive value when the difference in the carrier phase exceeds the positive predetermined value, and to set the difference in the carrier phase to a predetermined negative value when the difference in the carrier phase is less than the predetermined negative value.

3. A frequency offset compensation method, comprising:

calculating a frequency offset of a digital signal obtained by converting a signal in which signal light from an optical transmission path and local oscillation light are mixed, and, based on the frequency offset, compensating for a phase of the digital signal;

calculating a carrier phase of the digital signal the phase of which is compensated for;

calculating an average of differences in a carrier phase of each of a plurality of symbols and outputting the average as a residual frequency offset; and correcting the frequency offset using the output residual frequency offset, wherein a difference in the carrier phase is set to zero when an absolute value of the difference in the carrier phase exceeds a predetermined value.

4. The frequency offset compensation method according to claim 3, wherein a difference in the carrier phase is set to a predetermined positive value when the difference in the carrier phase exceeds the predetermined positive value, and the difference in the carrier phase is set to a predetermined negative value when the difference in the carrier phase is less than the predetermined negative value.

5. The optical communication receiving device according to claim 1, wherein an amount of each of the differences in the carrier phase is recorded in succession, and a phase skip component is corrected through unwrapping.

* * * * *